US008634599B2

(12) United States Patent
Sahin et al.

(10) Patent No.: US 8,634,599 B2
(45) Date of Patent: Jan. 21, 2014

(54) METHODS AND SYSTEMS OF AUTHENTICATION

(71) Applicants: Tevfik Burak Sahin, Arlington, VA (US); Michael Peirce, Dublin (IE); Nicolas Jacques Jean Sezille, Blackrock (IE)

(72) Inventors: Tevfik Burak Sahin, Arlington, VA (US); Michael Peirce, Dublin (IE); Nicolas Jacques Jean Sezille, Blackrock (IE)

(73) Assignee: Daon Holdings Limited, George Town (KY)

( * ) Notice: Subject to any disclaimer, the term of this patent is extended or adjusted under 35 U.S.C. 154(b) by 0 days.

(21) Appl. No.: 13/957,806

(22) Filed: Aug. 2, 2013

(65) Prior Publication Data

US 2013/0312090 A1   Nov. 21, 2013

Related U.S. Application Data

(63) Continuation of application No. 13/028,484, filed on Feb. 16, 2011, now Pat. No. 8,526,682, which is a continuation-in-part of application No. 13/025,729, filed on Feb. 11, 2011, now Pat. No. 8,548,206, which is a continuation-in-part of application No. 13/010,443, filed on Jan. 20, 2011, now Pat. No. 8,457,370.

(51) Int. Cl.
*G06K 9/00* (2006.01)

(52) U.S. Cl.
USPC ............................ 382/115; 382/218; 340/5.83

(58) Field of Classification Search
USPC ......... 382/115, 116, 117, 118, 124, 217, 218, 382/219; 340/5.82, 5.83
See application file for complete search history.

(56) References Cited

U.S. PATENT DOCUMENTS

2009/0171623 A1\* 7/2009 Kiefer ........................... 702/181
2012/0087549 A1\* 4/2012 Benini .......................... 382/115

FOREIGN PATENT DOCUMENTS

EP        1 903 509 A1    3/2008   ............... G07C 9/00

OTHER PUBLICATIONS

Extended European Search Report for EPO Application No. 12151319.6, dated May 14, 2012, pp. 1-10.
Kumar, "Incorporating Cohort Information for Reliable Palmprint Authentication," IEEE Computer Society, Dec. 16, 2008, pp. 583-590.

(Continued)

*Primary Examiner* — Andrew W Johns
(74) *Attorney, Agent, or Firm* — Kevin McDermott, Esq.

(57) ABSTRACT

A method of authentication is provided that includes capturing palm biometric data from an individual, transmitting the biometric data to an authentication system, and generating an authentication biometric template from the captured biometric data with the authentication system. Moreover, the method includes conducting a plurality of verification matching transactions between the authentication biometric template and enrollment biometric templates stored in the authentication system, and between the authentication biometric template and imposter biometric templates stored in the authentication system. Furthermore, the method includes updating a genuine matching score distribution with at least one genuine matching score, updating an imposter matching score distribution with at least one imposter matching score, and calculating a maximum genuine matching score and a minimum imposter matching score. Additionally, the method includes confirming an identity of the individual when the minimum imposter matching score is greater than the maximum genuine matching score.

17 Claims, 13 Drawing Sheets

(56) References Cited

OTHER PUBLICATIONS

Duta et al., "Matching of palmprints," Pattern Recognition Letters, Elsevier, vol. 23, No. 4, Feb. 1, 2002, pp. 477-485.

Pang et al., "Personal Authenticator on the Basis of Two-Factors: Palmprint Features and Tokenized Random Data," Advances in AI., vol. 3339, Dec. 4, 2004, pp. 227-236.

Burduk, "Probability Error in Bayes Optimal Classfier with Intuitionistic Fuzzy Observations," Image Analysis and Recognition, Springer Berlin Heidelberg, Jul. 6, 2009, pp. 359-368.

Doublet,"Robust GrayScale Distribution Estimation for Contactless Palmprint Recognition," Biometrics: Theory, Applications, & Systems, 1st IEEE Conf., Sep. 1, 2007, pp. 1-6.

* cited by examiner

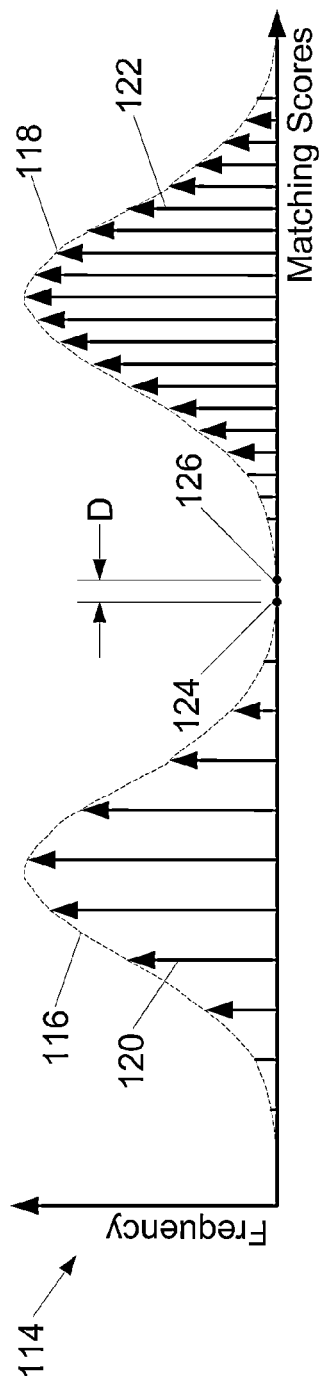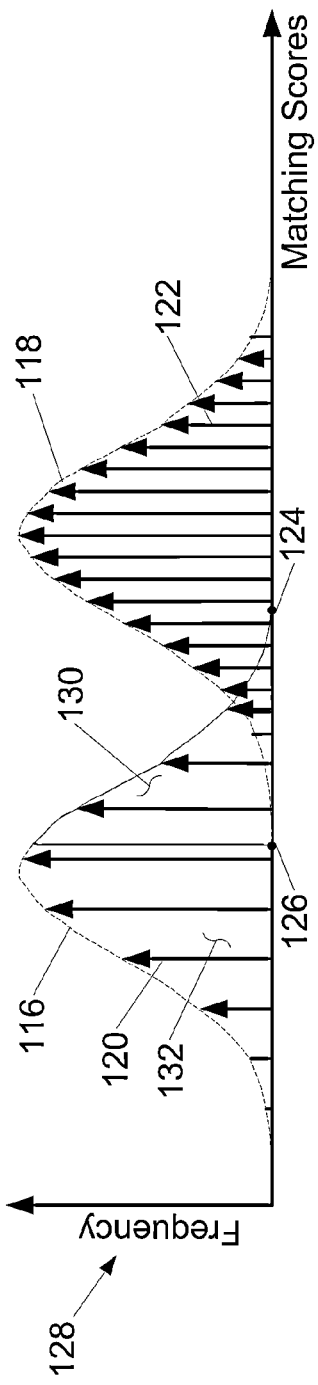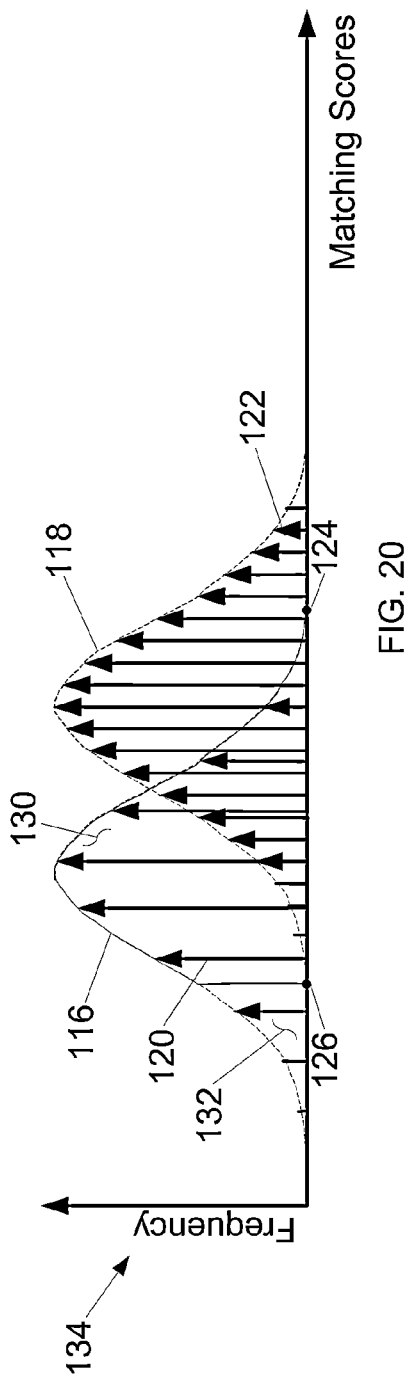

METHODS AND SYSTEMS OF AUTHENTICATION

CROSS-REFERENCE TO RELATED APPLICATIONS

This is a continuation application of U.S. patent application Ser. No. 13/028,484, filed Feb. 16, 2011, now U.S. Pat. No. 8,526,682, which is a continuation-in-part application of U.S. patent application Ser. No. 13/025,729, filed Feb. 11, 2011, now U.S. Pat. No. 8,548,206, which is a continuation-in-part application of U.S. patent application Ser. No. 13/010,443, filed Jan. 20, 2011, now U.S. Pat. No. 8,457,370, the disclosures of which are incorporated herein by reference.

BACKGROUND OF THE INVENTION

This invention relates generally to methods and systems that facilitate authenticating individuals, and more particularly, to methods and systems of authentication based on matching score distributions.

Known palm biometric data capture devices typically include a platen and an instrument positioned at a fixed distance from the platen. When a palm is placed on the platen such that the fingers are fully extended and in a known orientation, a high resolution palm image may be captured and the size of the palm accurately determined.

However, known palm biometric data capture devices are generally large and cumbersome. Thus, known palm biometric data capture devices are not typically portable. Moreover, such devices are not known to be readily available to the general public, thus, accessing such devices is inconvenient and time consuming for members of the general public. Furthermore, such devices have been known to be expensive. Additionally, because known devices require palm placement on the platen in a known orientation and at a known distance from the capture sensor, palm biometric data is not captured from a hand positioned freely in space.

Capturing palm biometric data for authentication with a device from a hand positioned freely in space has been known to be difficult because, due to folds and curves in the palm, palm biometric data captured at different times may present widely varying sets of palm features. Moreover, it has been observed that palm biometric data captured from a hand positioned freely in space, with a device, is generally captured at different orientations and at different angles relative to the device. Thus, it has been known that palm biometric data captured from a hand positioned freely in space is not typically reliable biometric data that may be used for accurate authentication.

BRIEF DESCRIPTION OF THE INVENTION

In one aspect, a method of authentication is provided that includes capturing palm biometric data with a device from an individual, transmitting the captured biometric data to a biometric authentication system, and generating an authentication biometric template from the captured biometric data with the biometric authentication system. Moreover, the method includes conducting a plurality of verification matching transactions between the authentication biometric template and enrollment biometric templates stored in the biometric authentication system, and between the authentication biometric template and imposter biometric templates stored in the biometric authentication system. The enrollment biometric templates and imposter templates are associated with the individual in the biometric authentication system, and the imposter biometric templates are generated from biometric data obtained from known imposters. Furthermore, the method includes updating a genuine matching score distribution with at least one genuine matching score generated during the conducting operation, updating an imposter matching score distribution with at least one imposter matching score generated during said conducting operation, and calculating a maximum genuine matching score and a minimum imposter matching score. Additionally, the method includes determining whether the minimum imposter matching score is greater than the maximum genuine matching score, and confirming an identity of the individual when the minimum imposter matching score is greater than the maximum genuine matching score.

In another aspect, a system for conducting matching transactions is provided that includes an authentication system including an authentication database. The authentication system is configured to communicate with devices and to store within the database authentication data for a plurality of individuals, matching scores, and matching score distributions. The system also includes a device configured to communicate with at least the authentication system and to capture biometric data positioned freely with respect to the device. The authentication system is further configured to generate an authentication biometric template from captured biometric data, and conduct matching transactions between the authentication biometric template and enrollment biometric templates stored therein, and between the authentication biometric template and imposter biometric templates stored therein. Moreover, the authentication system is configured to generate a genuine matching score distribution and an imposter matching score distribution, and calculate a maximum genuine matching score and a minimum imposter matching score. Furthermore, the authentication system is further configured to confirm an identity of an individual associated with the captured biometric data when the minimum imposter matching score is greater than the maximum genuine matching score.

In yet another aspect, a method of authentication is provided that includes generating a genuine matching score distribution and an imposter matching score distribution with a biometric authentication system. Moreover, the method includes conducting matching transactions between an authentication biometric template and enrollment biometric templates and between the authentication biometric template and imposter biometric templates. The authentication biometric template is generated from palm biometric data of an individual. Furthermore, the method includes updating the matching score distribution and the imposter score distribution with results generated during the conducting operation, determining whether a minimum imposter matching score is greater than a maximum genuine matching score, and confirming an identity of the individual when the minimum imposter score is greater than the maximum genuine matching score.

BRIEF DESCRIPTION OF THE DRAWINGS

FIG. 18 is a diagram illustrating an exemplary genuine matching score distribution and an exemplary imposter matching score distribution;

FIG. 19 is a diagram illustrating an overlapping score distribution region between the exemplary genuine matching score distribution and the exemplary imposter matching score distribution shown in FIG. 18;

FIG. 20 is a diagram illustrating a wider overlapping score distribution between the exemplary genuine matching score distribution and the exemplary imposter matching score distribution.

DETAILED DESCRIPTION OF THE INVENTION

Figure 1:
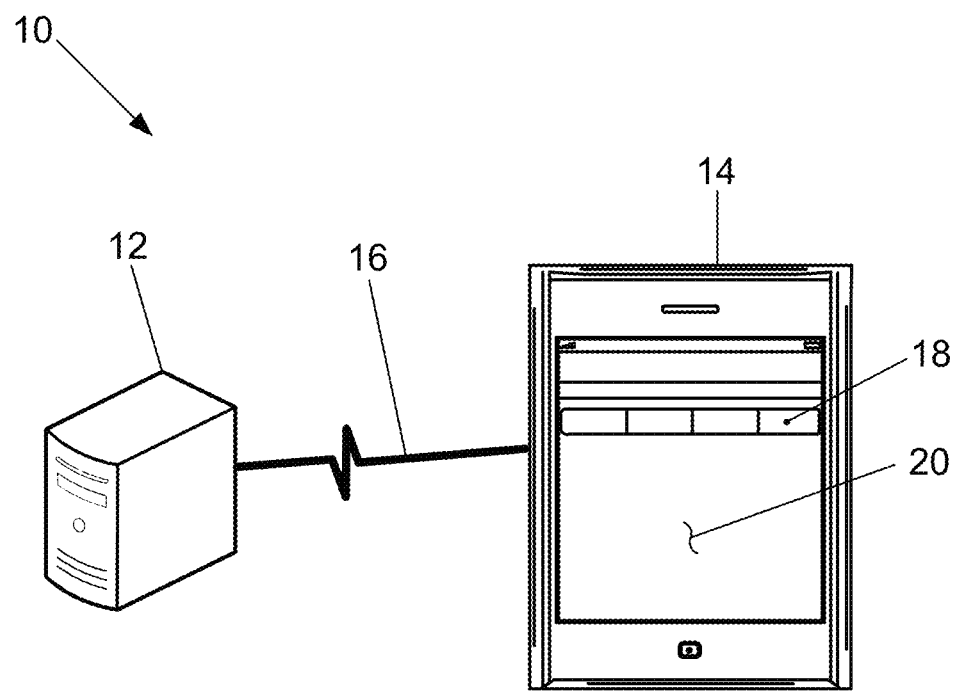
FIG. 1 is a block diagram of an exemplary embodiment of an Authentication Computer (AC) System for authenticating users.

FIG. 1 is an expanded block diagram of an exemplary embodiment of a system architecture of an Authentication Computer (AC) System 10 for authenticating the identity of a user. More specifically, the AC system 10 includes a Biometric Authentication Computer (BAC) System 12 and a device 14.

The BAC system 12 includes components such as, but not limited to, a web server, a disk storage device, a database management server and an authentication server arranged to be combined into a single structure. Although these components are combined into a single structure in the exemplary embodiment, it should be appreciated that in other embodiments these components may be separately positioned at different locations and operatively coupled together in a network such as, but not limited to, a local area network (LAN), a wide area network (WAN) and the Internet. The disk storage device may be used for storing any kind of data including, but not limited to, biometric data, results of filtering analyses, scale factors, coordinates, correlation factors, matching scores, and matching score distributions. The database management server may be used to facilitate transferring data to and from the disk storage device. The authentication server is configured to at least perform matching of any feature or information associated with individuals to authenticate the identity of individuals as described herein.

The BAC system 12 is configured to wirelessly communicate with the device 14 over a communications network 16 in the exemplary embodiment. Moreover, the BAC system 12 is operable to communicate with other computer systems (not shown) over a network (not shown) such as, but not limited to, a local area network (LAN), a wide area network (WAN) and the Internet. In the exemplary embodiment, the communications network 16 is a 3G communications network. However, it should be appreciated that in other embodiments the communications network 16 may be any network that facilitates authentication as described herein, such as, but not limited to, Wi-Fi, Global System for Mobile Communications (GSM), General Packet Radio Service (GPRS), Enhanced Data for GSM Environment (EDGE), a LAN, a WAN and the Internet.

The BAC system 12 is also operable to store biometric data and to conduct authentication matching transactions with biometric data. Specifically, in the exemplary embodiment, biometric data that may be used as the basis of authentication is captured from individuals during enrollment and is stored in the BAC system 12. The biometric data may take any form such as, but not limited to, images, photographs, templates and electronic data representations. Using biometrics as the basis for authentication facilitates enhancing trust in authentication matching transaction results.

The BAC system 12 stores the biometric data of each individual captured during enrollment in respective enrollment data records. The captured biometric data corresponds to a biometric modality desired for conducting authentication transactions. In the exemplary embodiment, the desired biometric modality is the palm of a right hand. However, in other embodiments the palm biometric data may be from the left hand. In yet other embodiments the biometric data desired for conducting authentication transactions may correspond to any other biometric modality that facilitates authentication as described herein. Such other biometric modalities include, but are not limited to, hand geometry, foot, face, iris, vascular patterns and hand signatures.

The captured biometric data for each individual is processed during enrollment to generate an enrollment biometric template, for each respective individual, which is used by the BAC system 12 to conduct authentication matching transactions. In the exemplary embodiment, each enrollment data record includes at least the captured biometric data and the enrollment biometric template of a respective individual. Moreover, an outline image is generated for each individual and included in the respective enrollment data record. In other embodiments each enrollment data record may also include any kind of data that may be used in authentication. Such data includes, but is not limited to, biographic data, biometric data for biometric modalities different than the biometric modality desired for conducting authentication transactions, and any combination of biometric modality data. The term "biographic data" as used herein includes any demographic information regarding an individual such as, but not limited to, an individual's name, age, date of birth, address, citizenship and marital status.

The BAC system 12 also stores imposter biometric templates. During authentication matching transactions an authentication biometric template generated for an individual to be authenticated may be compared against at least one enrollment biometric template of the individual, and against at least one biometric template associated with at least one known different individual. The at least one different individual is considered to be a known imposter during an authentication matching transaction because he is not the individual to be authenticated. Thus, the biometric template of a known imposter is referred to herein as an imposter biometric template. Consequently, it should be understood that imposter biometric templates are biometric templates that do not originate from an individual to be authenticated. Each imposter biometric template is generated through the same process described in the exemplary embodiment used to generate the enrollment biometric templates.

In the exemplary embodiment, biometric features are extracted from the captured biometric data by the BAC system 12 and are included as data in the enrollment biometric template generated by the BAC system 12. The enrollment biometric templates are a compact representation of the biometric features included in the captured biometric data, and are used for authenticating individuals. Although captured biometric data for each individual is stored in the BAC system 12 in the exemplary embodiment, in other embodiments the captured biometric data may be stored in a server system different than the BAC system 12.

Although the biometric data is captured from individuals during enrollment in the BAC system 12, it should be appreciated that in other embodiments the biometric data may be obtained by any other method including, but not limited to, automatically reading or extracting the biometric data from identity documents or from legacy data bases included in other computer systems. Likewise, biometric templates and outline images corresponding to the biometric data may be obtained by any method including, but not limited to, automatically reading or extracting the biometric templates and outline images from identity documents or from legacy data bases included in other computer systems. It should be understood that biometric templates and outline images corresponding to desired biometric data may be obtained in addition to, or instead of, the desired biometric data. Such other legacy database systems include, but are not limited to, systems associated with motor vehicle administrations, social security administrations, welfare system administrations, financial institutions and health care providers. Such identity documents include, but are not limited to, passports and driver's licenses. It should be appreciated that by extracting desired biometric data, or biometric templates and outline images, from a legacy database or identity document, and storing the extracted data in the BAC system 12, individuals may be enrolled therein without having to provide biometric data.

Moreover, the BAC system 12 stores authentication policies therein which are used to determine data that is to be captured or obtained from an individual attempting to enroll in the BAC system 12. Furthermore, additional authentication policies may be stored in the BAC system 12 that determine data to be captured from an individual requesting biometric authentication.

The BAC system 12 is also operable to at least conduct any type of matching transaction, process biometric data into an outline image, and determine transformations and scale factors. Moreover, the BAC system 12 is operable to calculate at least coordinates, correlation factors, false match rates, false non-match rates, matching scores, and equal error rates. Furthermore, the BAC system 12 is operable to generate matching score distributions from matching scores. A matching score distribution is a function of matching scores that represents the frequency of a given matching score in a collection of matching scores. A genuine matching score distribution is a matching score distribution in which all matching scores are obtained by matching a biometric template against another biometric template that is known, or believed, to belong to the same biometric of the same individual and obtained at a different instance. An imposter matching score distribution is a matching score distribution in which all matching scores are obtained by matching a biometric template against another biometric template that is known, or believed, to belong to the same biometric of a different individual or a different biometric of the same individual.

The device 14 includes at least one of buttons and icons 18 operable to at least enter commands, enter data and invoke applications stored therein. Moreover, the device 14 includes a display screen 20 such as, but not limited to, a Liquid Crystal Display (LCD), and is operable to display any text or image on the display screen 20. In the exemplary embodiment, the device 14 is a smart phone operable to at least display messages and images, capture biometric data, and transmit the captured biometric data to the BAC system 12. By virtue of being a smart phone the device 14 is portable in the exemplary embodiment. However, in other embodiments the device 14 may not be portable.

Although the device 14 is a smart phone in the exemplary embodiment, it should be appreciated that in other embodiments the device 14 may be any device capable of at least communicating with the BAC system 12, displaying messages and images, and capturing and processing biometric data, and transmitting data. Such other devices 14 include, but are not limited to, a tablet computer, a television, a camera, a personal desktop computer, a laptop computer, and a personal digital assistant (PDA). Since each of the listed devices may communicate with other devices, the device 14 may also be described as a communications device.

The device 14 is configured to wirelessly communicate with at least the BAC system 12 over the network 16. Moreover, in the exemplary embodiment the device 14 is used to capture biometric data from individuals. Specifically, a security application is stored in the device 14 that facilitates capturing biometric data with the device 14 during enrollment and authentication. When an individual decides to capture biometric data, the security application is invoked by activating a button or icon 18. It should be understood that an operator may invoke the security application and otherwise operate the device 14 during enrollment and authentication. The operator may be the individual offering biometric data for capture during enrollment or authentication, or may be a user different than the individual. After invoking the security application during enrollment, the security application causes the device 14 to display a biometric data capture request message in the display screen 20 prompting the user to capture desired biometric data. After biometric data in accordance with the capture request message is captured with the device 14, the security application causes the device 14 to transmit the captured biometric data to the BAC system 12. In the exemplary embodiment the security application also causes the device 14 to display outline images. In other embodiments after capturing the desired biometric data with the device 14, the security application may cause the device 14 to process the captured biometric data into an outline image and transmit both the captured biometric data and outline image to the BAC system 12. The device 14 does not store the captured biometric data therein and does not store biometric templates and outline images generated therefrom therein.

The memories (not shown) in the BAC 12 and the device 14 can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like.

Each memory (not shown) can be a computer-readable recording medium used to store data in the BAC system 12 and the device 14, and store computer programs, applications, or executable instructions that are executed by the BAC system 12 and the device 14. Moreover, the memory (not shown) may include smart cards, SIMs or any other medium from which a computing device can read computer programs or executable instructions. As used herein, the terms "computer program" and "application" are intended to encompass an executable program that exists permanently or temporarily on any computer-readable recordable medium that causes the computer or computer processor to execute the program.

Figure 2:
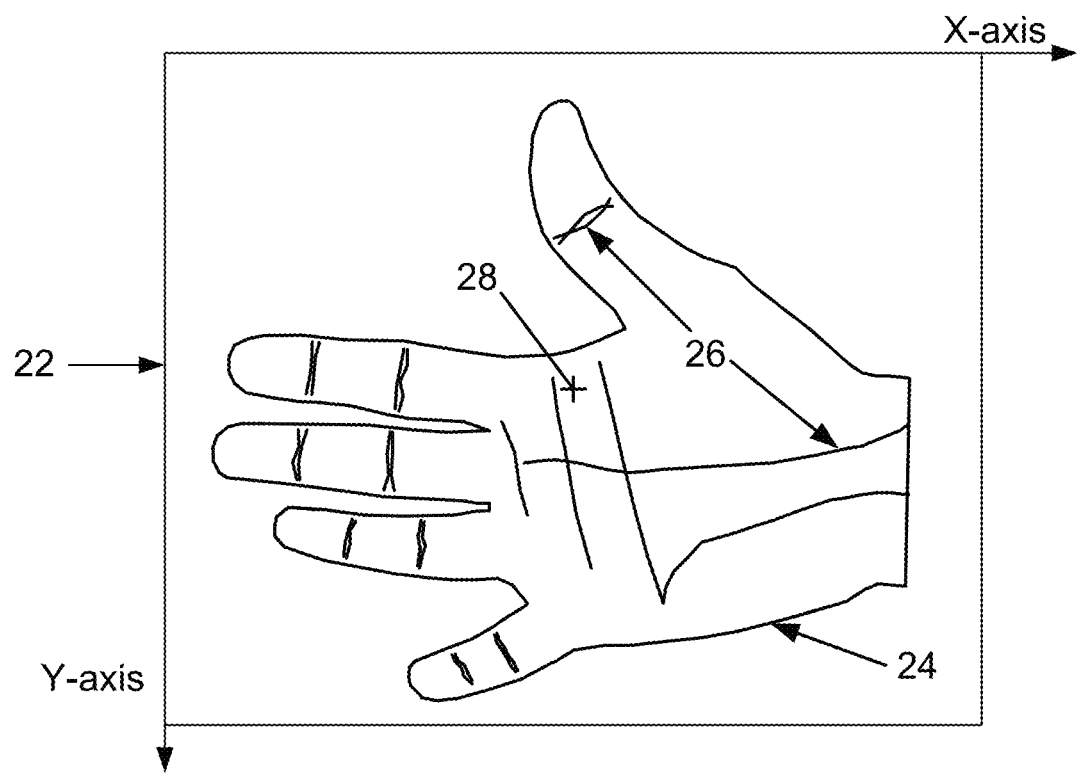
FIG. 2 is a plan view of an exemplary hand image captured during enrollment.

FIG. 2 is a plan view of an exemplary enrollment hand image 22 captured with the device 14 during enrollment in the BAC system 12. The enrollment hand image 22 includes a right hand 24 that includes biometric features 26 which in the exemplary embodiment are lines and wrinkles However, in other embodiments the biometric features 26 may be any biometric feature including, but not limited to, ridge lines. It should be understood that the enrollment hand image 22 is rectangular-shaped, includes a center point 28, is digital, and is positioned on a first Cartesian coordinate system that includes an X-axis and a Y-axis.

It should be understood that digital images include an array of pixels and that each pixel occupies a position within the array. Thus, the position of each pixel within a digital image positioned on a Cartesian coordinate system is determined by the coordinates of the Cartesian coordinate system. Because the enrollment hand image 22 is digital and is positioned on the first Cartesian coordinate system, the positions of pixels within the enrollment hand image 22 are defined by the first Cartesian coordinate system.

Figure 3:
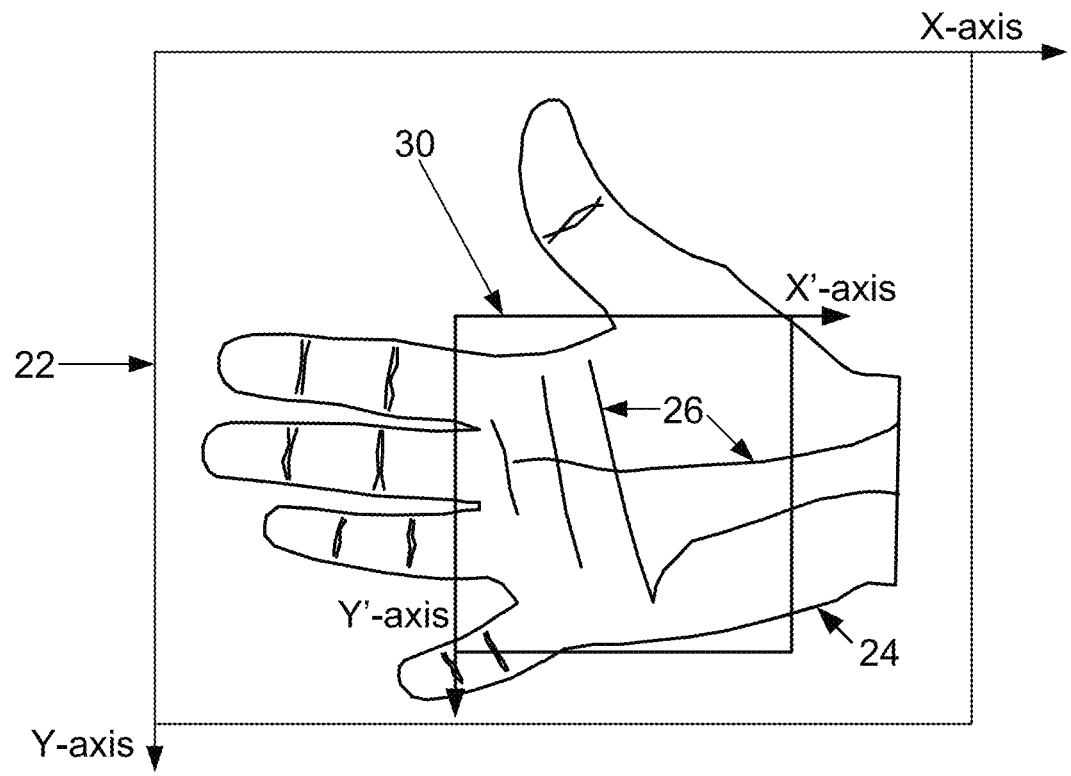
FIG. 3 is the plan view of the exemplary hand image as shown in FIG. 2, further including an enrollment region of interest.

FIG. 3 is the plan view of the exemplary enrollment hand image 22 as shown in FIG. 2, further including an enrollment region of interest 30 positioned mostly on the palm area of the hand 24. In the exemplary embodiment, the enrollment region of interest 30 is square-shaped. However, in other embodiments the enrollment region of interest 30 may have any shape including, but not limited to, rectangle and circle. The enrollment region of interest 30 is positioned on a second Cartesian coordinate system that includes an X'-axis and a Y'-axis. The enrollment region of interest 30 defines part of biometric data captured during enrollment that is to be included in an enrollment biometric template for use during authentication. Because the region of interest 30 is positioned on the hand 24 to include mostly the palm portion of the hand 24, palm biometric data is to be used for authentication in the exemplary embodiment.

Figure 4:
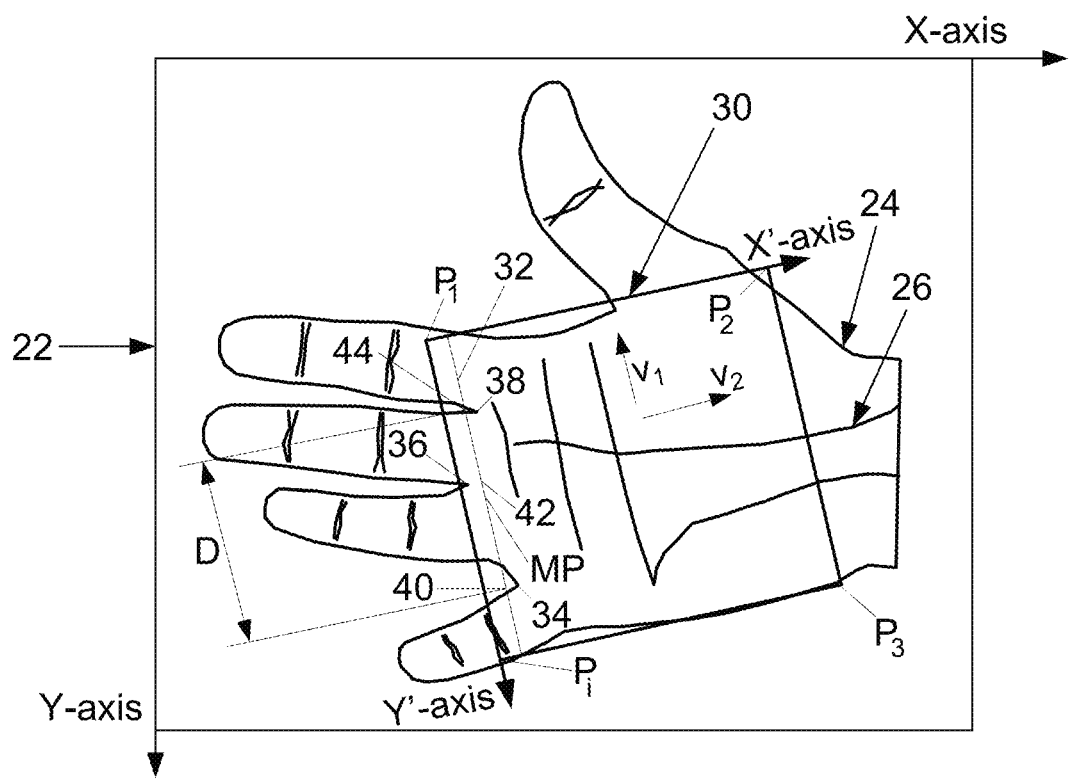
FIG. 4 is the plan view of the exemplary hand image as shown in FIG. 3, further including a best fit line.

FIG. 4 is the plan view of the enrollment hand image 22 as shown in FIG. 3, further including a best fit line 32 for use in constructing the enrollment region of interest 30. In the exemplary embodiment, the enrollment region of interest 30 is constructed by first calculating coordinates of points 34, 36, 38 in accordance with the first Cartesian system. Points 34, 36, 38 are each positioned at the base between different fingers. Next, constructing the enrollment region of interest 30 continues by determining the line 32 that constitutes a best fit between points 34, 36, 38, and determining a normal projection from each point 34, 36, 38 to the best fit line 32. Each normal projection intersects the best fit line 32 to define further points 40, 42, 44, respectively. The coordinates of points 40, 42, 44 are calculated in accordance with the first Cartesian coordinate system. A distance D is determined between points 40 and 44 that may be referred to as a scale identifying number or a scale factor. Next, the coordinates of a midpoint MP between points 40 and 44 are calculated in accordance with the first Cartesian coordinate system, and a vector $v_1$ parallel to the best fit line 32 and a vector $v_2$ normal to the best fit line 32 are determined. The scale identifying number D, the coordinates of the midpoint MP, and the vectors $v_1$ and $v_2$ are then substituted into an equation $P_i = MP + a_1 D v_1 + b_1 D v_2$ to calculate the coordinates of each corner of the region of interest 30. The designation "i" as used in conjunction with the corner points $P_i$, is intended to indicate that any number "i" of corner points, appropriate for any geometric shape, may be used that facilitates authentication as described herein. It should be appreciated that $a_1$ and $b_1$ designate coefficients that facilitate calculating the coordinates of corner points $P_i$. By virtue of determining the coordinates of points $P_i$, in accordance with the first Cartesian coordinate system, it should be appreciated that the enrollment region of interest 30 is defined.

Although the exemplary embodiment determines the enrollment region of interest 30 by calculating the coordinates of each corner using an equation, it should be appreciated that differently shaped enrollment regions of interest 30 may be determined using other methods, equations or mathematical relationships.

Figure 5:
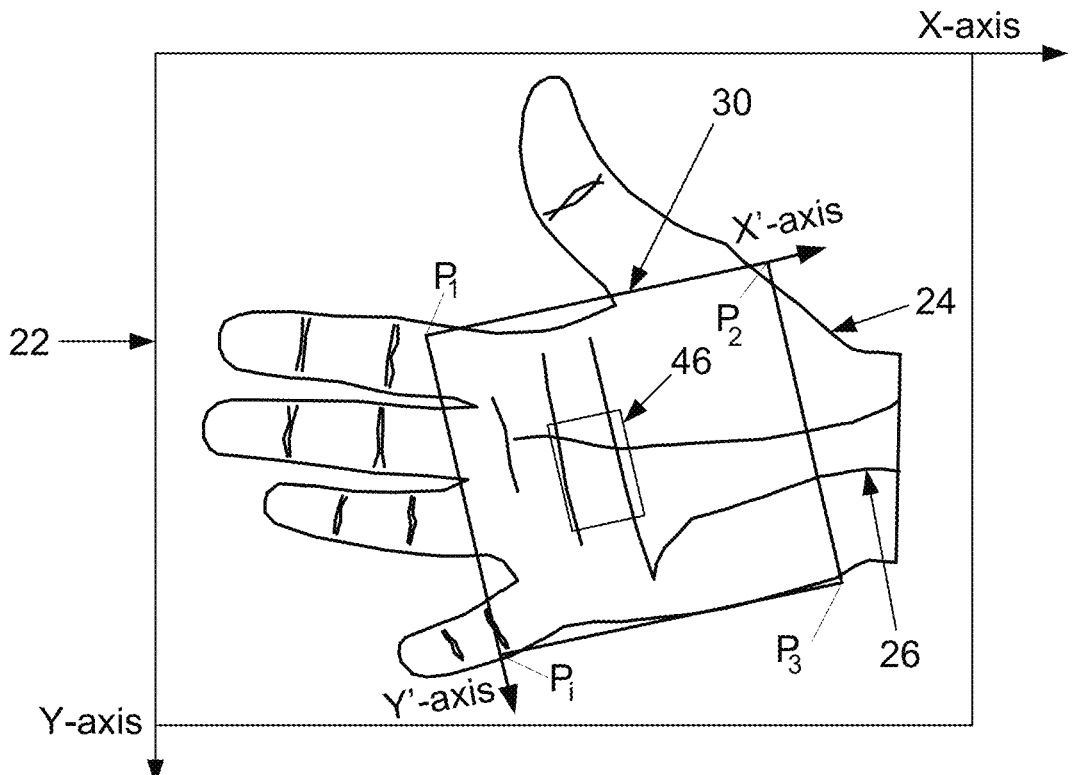
FIG. 5 is the plan view of the exemplary hand image as shown in FIG. 3, further including a patch area.

FIG. 5 is the plan view of the exemplary enrollment hand image 22 as shown in FIG. 3, further including a patch area 46. In the exemplary embodiment, the patch area 46 is rectangular-shaped, has a fixed size that is smaller than the enrollment region of interest 30, and is positioned at a center of gravity of the hand 24. It should be understood that the patch area 46 is not merely a rectangular geometric shape superimposed on the hand 24. Rather, the patch area 46 represents a copy of a portion of the enrollment hand image 22 within the bounds of the patch area 46. The coordinates of the center of gravity of the hand are calculated in accordance with the second Cartesian coordinate system. Next, the center of the patch area 46 is positioned to be coincident with the center of gravity. Thus, after positioning the center of the patch area 46 on the center of gravity, the center of the patch area 46 has the same coordinates as the center of gravity of the hand 24. In the exemplary embodiment sides of the patch area 46 are parallel to the sides of the enrollment region of interest 30. However, in other embodiments it is not necessary that the sides of the patch area 46 be parallel to the sides of the enrollment region of interest 30.

It should be understood that the position of the enrollment region of interest 30 and the position of the patch area 46 are not related. However, the patch area 46 is to be positioned completely within the enrollment region of interest 30. Although the patch area is rectangular-shaped in the exemplary embodiment, in other embodiments the patch area 46 may be any shape including, but not limited to, square and circle. Moreover, in other embodiments instead of positioning the center of the patch area 46 coincident with the center of gravity of the hand 24, the patch area 46 may be positioned at areas on the hand 24 within the enrollment region of interest 30 that have a higher density of biometric features than other areas. A biometric template of the patch area 46 and an enrollment biometric template of the portion of hand 24 within the enrollment region of interest 30 are generated by the BAC system 12 and stored therein. Because the region of interest 30 is positioned on the hand 24 to include mostly the palm portion of the hand 24, by thus generating the enrollment biometric template palm biometric data is considered to have been captured such that biometric authentication based on palm biometric data may be conducted.

Figure 6:
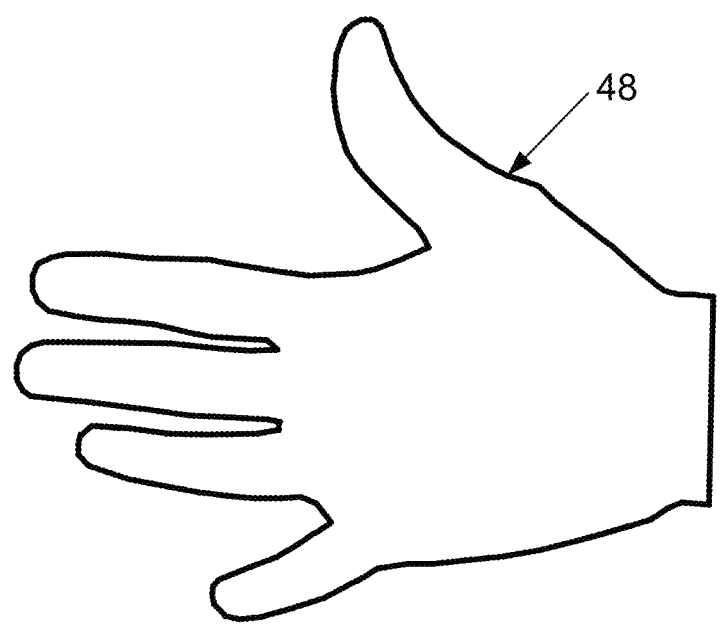
FIG. 6 is a plan view of an exemplary outline image of a hand.

FIG. 6 is a plan view of an exemplary outline image 48 of the hand 24 that is generated by the BAC system 12 from the enrollment hand image 22 in the exemplary embodiment. However, in other embodiments the outline image 48 may be generated by the device 14.

Figure 7:
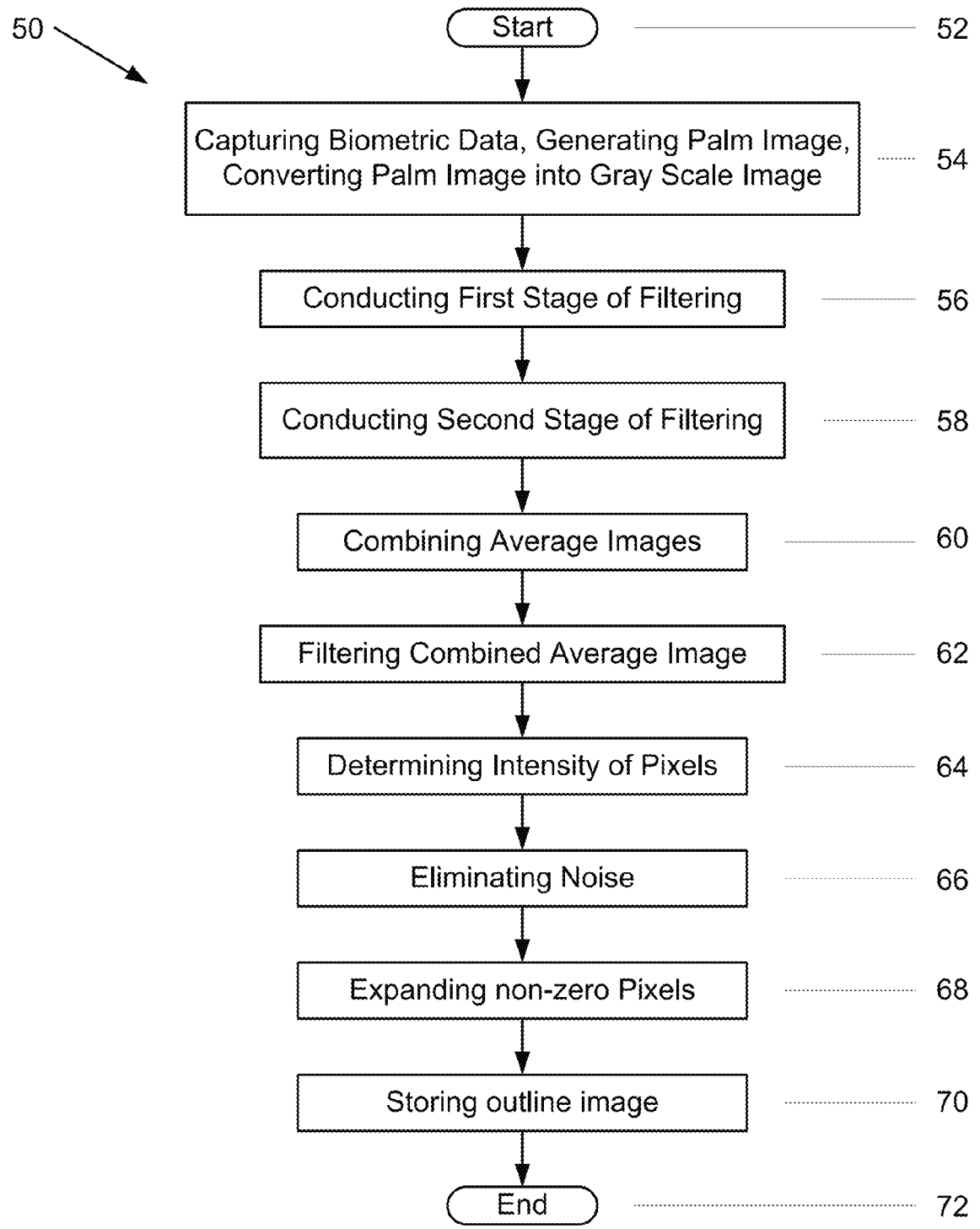
FIG. 7 is a flowchart illustrating an exemplary process for generating an outline image.

FIG. 7 is a flowchart 50 illustrating an exemplary process for generating the outline image 48 from the enrollment hand image 22 during enrollment in the BAC system 12. Specifically, the generating process starts 52 by capturing desired biometric data 54 from an enrolling individual with the device 54 and transmitting the captured biometric data to the BAC system 12. In the exemplary embodiment, the desired biometric data is the palm side of the right hand. The BAC system 12 continues processing by generating 54 the enrollment hand image 22 from the captured hand biometric data, and converting the enrollment hand image 22 into a gray scale hand image.

Next, processing continues by conducting a first stage of filtering 56. Specifically, processing continues by filtering the gray scale hand image with a first filter and with a second filter. As a result, the first filter generates a first digital image and the second filter generates a second digital image. Next, processing continues by determining an average image of the first and second images which is referred to herein as a first average image. Because the first and second images are digital images, the first average image is also a digital image.

Next, processing continues by conducting a second stage of filtering 58. Specifically, processing continues by rotating the gray scale hand image about the center point 28 clockwise by forty-five degrees and filtering the rotated gray scale hand image with the first filter and with the second filter. As a result, the first filter generates a first rotated digital image and the second filter generates a second rotated digital image. Processing continues by determining an average image of the first and second rotated images which is referred to herein as a second average image. Because the first and second rotated images are rotated digital images of the gray scale hand image, the second average image is also a rotated digital image of the gray scale hand image. In the exemplary embodiment, the first and second filters are different Sobel filters. However, in other embodiments any type of edge detection filter may be used that facilitates generating the outline image 48 as described herein. Moreover, in yet other embodiments any process may be used that facilitates generating the outline image 48 including, but not limited to, conducting statistical color analysis, clustering, and any combination of such processes with each other or in concert with conducting edge detection using edge detection filters.

Next, processing continues by combining the first and second average images 60 to form a combined average digital image. Specifically, processing continues by rotating the second average image about the center point 28 counterclockwise by forty-five degrees and determining the intensity of each pixel included in the first average image and in the second average image. Each pixel in the first average image has a corresponding pixel in the second average image. Corresponding pixels in the first and second average images have the same coordinates and constitute a pair of pixels. Each pair of pixels is compared against a range of intensities that includes a low intensity range, a middle intensity range, and a high intensity range. When at least one of the pixels included in each pair has an intensity in the middle intensity range, a pixel in the combined average image corresponding to each pixel of the pair, is set to a positive non-zero value of 255. Otherwise, the combined average image pixel corresponding to each pixel of the pair is set to zero.

After combining the average images 60 to form the combined average image, processing continues by filtering the combined average image 62 with a smoothing filter. In the exemplary embodiment the smoothing filter is a Gaussian function having a standard deviation of one. However, in other embodiments any filter may be used that facilitates determining the outline image 48 as described herein. A smoothed combined average image is generated as the result of the filtering operation 62. Processing continues by converting the smoothed combined average image into a binary image. Specifically, processing continues by determining the intensity 64 of each pixel in the smoothed combined average image. Each pixel in the smoothed combined average image having an intensity below a mid-point value of 128 is given a value of zero. All other pixels in the smoothed combined average image are given a value of one. By thus giving each pixel in the smoothed combined average image a value of zero or one, the smoothed combined average image is converted into a binary image that represents a preliminary outline image of the right hand 24.

Next, processing continues by eliminating noise 66 from the preliminary outline image. Specifically, processing continues by determining four-connected sets of pixels within the preliminary outline image and determining a population of each four-connected set of pixels. When the population of a four-connected set of pixels is less than a threshold value, each pixel included in the four-connected set of pixels is given a value of zero. Otherwise, when the population of a four-connected set of pixels is at least equal to the threshold value, each pixel value included in the four connected set of pixels remains unchanged.

After eliminating noise 66 from the preliminary outline image, processing continues by expanding each non-zero value pixel 68 included in the preliminary outline image by a predetermined width in both the X and Y directions of the first Cartesian coordinate system. Doing so, facilitates enhancing the visibility of the preliminary outline image and thus results in the outline image 48 of the right hand 24. Processing continues by storing 70 the outline image 48 in the BAC system 12. Next, processing ends 72.

Although the outline image 48 is stored in the BAC system 12 after expanding each non-zero value pixel in the exemplary embodiment, in other embodiments after expanding each non-zero value pixel processing may continue by transmitting the captured biometric data and outline image 48 to the device 14, and displaying the captured biometric data and outline image 48 on the display screen 20. The operator continues processing by reviewing the outline image 48 for correctness and confirms that the outline image 48 is correct by activating a button or icon 18. For example, the operator may confirm that the outline image 48 includes the correct number of fingers. After confirming that the outline image 48 is correct, processing continues by transmitting the captured biometric data and outline image 48 to the BAC system 12 for storage therein. When the outline image 48 is not confirmed as correct, processing may continue by again capturing biometric data at operation 54. Otherwise, processing ends 72.

Although the BAC system 12 generates the outline image 48 in the exemplary embodiment, in other embodiments upon capturing the biometric data, the device 14 may generate the outline image 48 and transmit the outline image 48 and captured biometric data to the BAC system 12. In such other embodiments, upon generating the outline image 48 the device 14 may continue processing by presenting the outline image and captured biometric data on the display screen 20 for review by the operator. After confirming that the outline image is correct, processing may continue by transmitting the captured biometric data and outline image 48 to the BAC system 12 for storage therein. Such other embodiments avoid repeatedly transmitting the captured biometric data and outline image 48 between the BAC system and device 14.

A frequently encountered problem associated with automated biometrics may be location of the biometric data offered for capture. Thus, it should be appreciated that by virtue of confirming that the outline image 48 is correct, the operator may also confirm that a correct location of the biometric data offered for capture has been determined.

Although hand biometric data is captured during enrollment in the BAC system 12 without using an outline image in the exemplary embodiment, it should be appreciated that in other embodiments a generic outline image of an average sized hand may be presented on the display screen 20 to facilitate capturing biometric data and generating the outline image 48 during enrollment. In yet other embodiments, any type of visual aid may be shown on the display screen 20 that would function as a guide for enabling an operator to capture the desired biometric data in accordance with a prescribed manner. Such visual aids include, but are not limited to, circles, lines, curves and marks.

Although the second stage of filtering is conducted by rotating and then filtering the gray scale hand image in the exemplary embodiment, in other embodiments instead of rotating the gray scale image, the first and second filters may be mathematically modified to effect a forty-five degree rotation prior to filtering the gray scale hand image. Applying the mathematically modified first and second filters to the gray scale hand image generates first and second rotated digital images that are about the same as those generated in the exemplary embodiment. Moreover, although the gray scale hand image is rotated by forty-five degrees in the exemplary embodiment, in other embodiments the gray scale hand image may be rotated by any angle that facilitates determining the outline image 48 as described herein. Furthermore, in yet other embodiments the first and second filters may be mathematically modified to effect any degree of rotation that facilitates determining the outline image 48 as described herein.

Although biometric data of the palm side of the right hand is used to generate the outline 48 in the exemplary embodiment, it should be appreciated that in other embodiments biometric data of different biometric modalities may be captured and used to generate the outline image 48. Such different biometric modalities include, but are not limited to, hand geometry, face, iris, vascular patterns, hand signatures, and foot. Moreover, it should be appreciated that such different biometric modalities may have biometric features, different than wrinkles and lines that can be extracted from the captured biometric data and included in a biometric template. For example, when iris biometric data is captured during enrollment or authentication, phase information and masking information of the iris may be extracted from the captured iris biometric data and included in a biometric template.

Figure 8:
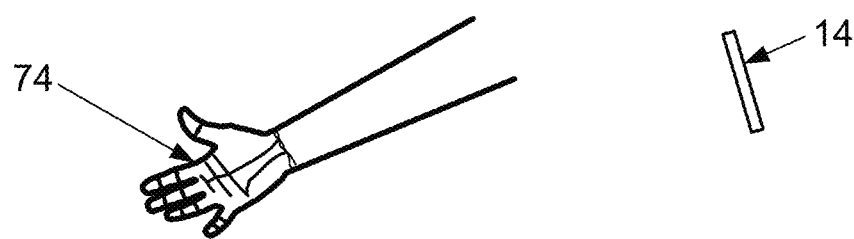
FIG. 8 illustrates capturing biometric data with a device during authentication.

FIG. 8 illustrates capturing biometric data with the device 14 during authentication. Specifically, the palm side of a right hand 74 of an individual desiring to be authenticated is positioned proximate the device 14 such that an image of the hand 74 appears on the display screen 20. It should be understood that the hand 74 is not controllably oriented on a surface in a fixed position or physically constrained in any way. Rather, the individual being authenticated freely positions his hand proximate to, and with respect to, the device 14 such that the image of the hand 74 appears in the display screen 20. Because the hand 74 is not physically constrained in any way, palm biometric data may be captured while the hand 74 is positioned freely in space. The outline image 48 also appears on the display screen 20 during authentication in a stationary position.

Figure 9:
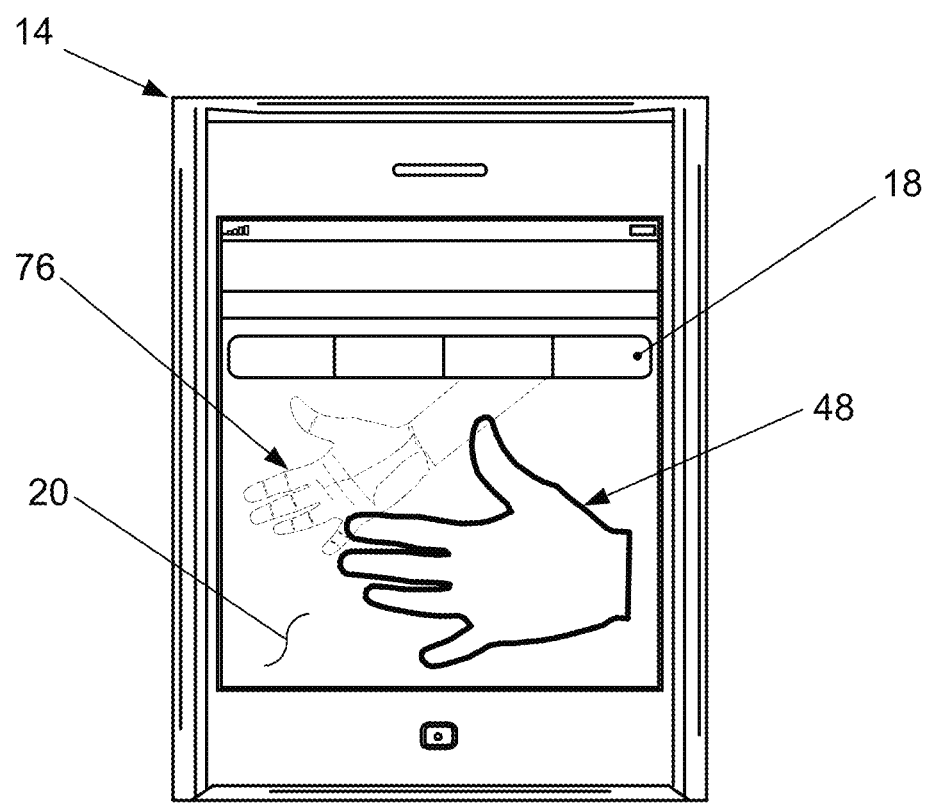
FIG. 9 illustrates the outline image and an initial position of a hand image as shown on a display screen of a device.

FIG. 9 illustrates the outline image 48 and an initial position of an image 76 of the hand 74 as shown on the display screen 20 while capturing biometric data during authentication. The hand image 76 in the initial position does not align with the outline image 48. Consequently, the device 14 and the hand 74 are repositioned with respect to each other such that the hand image 76 shown on the display screen 20 better aligns with the outline image 48 shown on the display screen 20.

Figure 10:
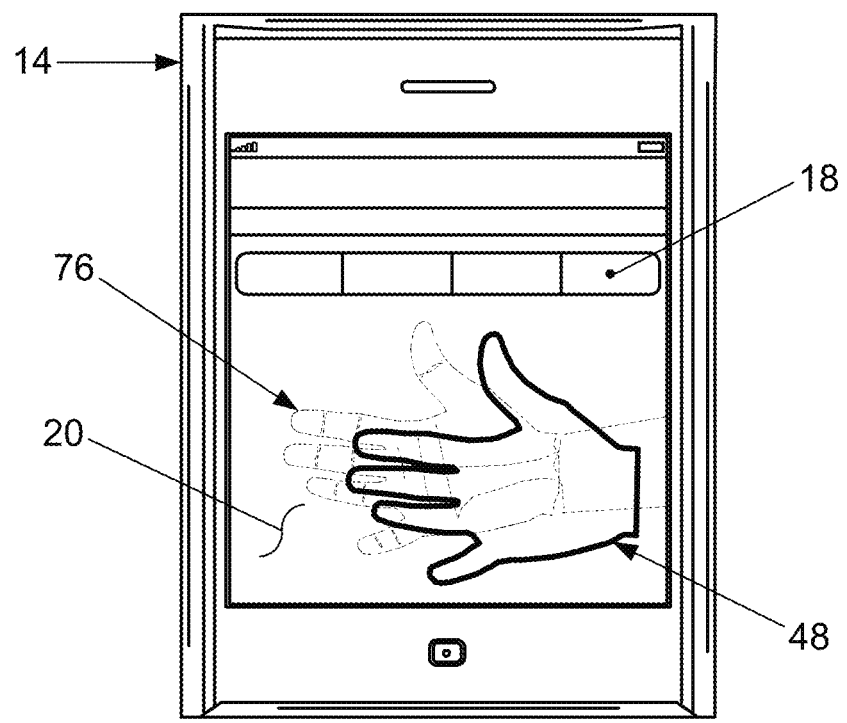
FIG. 10 illustrates the outline image and a subsequent position of the hand image as shown in the display of the device.

FIG. 10 illustrates the outline image 48 and a subsequent position of the hand image 76 as shown on the display screen 20 while capturing biometric data during authentication. After repositioning the device 14 and the hand 74 with respect to each other, the hand image 76 as shown on the display screen 20 has been rotated and translated from the initial position into the subsequent position. However, the subsequent position of the hand image 76 as shown on the display screen 20 does not adequately align with the outline image 48 as shown on the display screen 20. Consequently, the device 14 and the hand 74 are further repositioned with respect to each other such that the hand image 76 as shown on the display screen 20 is better aligned with the outline image 48 shown on the display screen 20.

Figure 11:
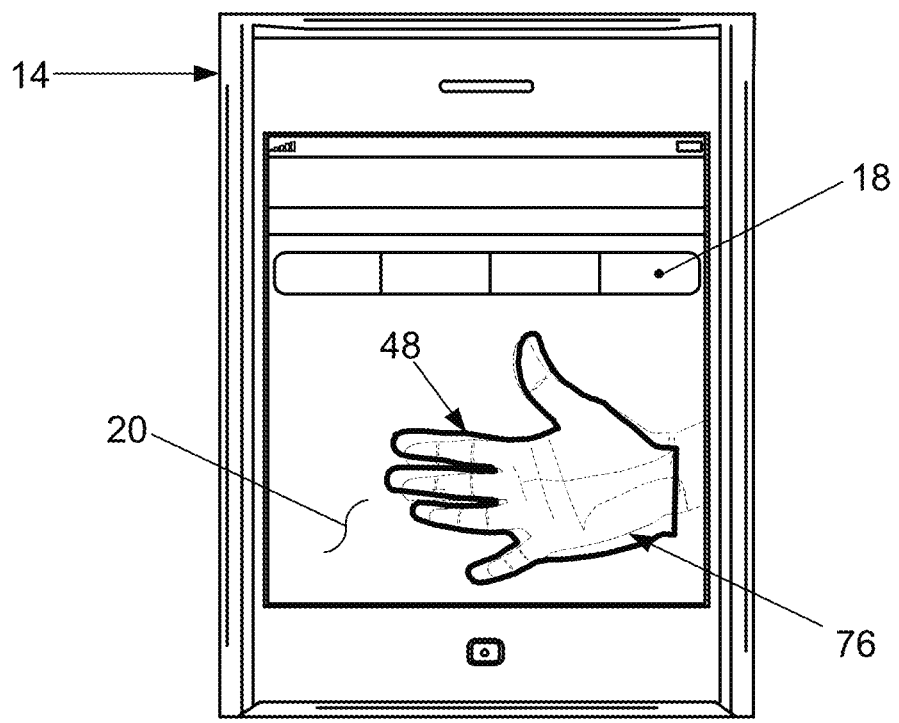
FIG. 11 illustrates the outline image and an aligned position of the hand image as shown in the display of the device.

FIG. 11 illustrates the outline image 48 and an aligned position of the hand image 76 as shown on the display screen 20 while capturing biometric data during authentication. After further repositioning the device 14 and the hand 74 with respect to each other, the hand image 76 has been further rotated and translated from the subsequent position such that the hand image 76 as shown on the display screen 20 approximately aligns with the outline image 48 shown on the display screen 20. When the hand image 76 shown in the display screen 20 approximately aligns with the outline image 48 shown on the display screen 20, the operator captures hand biometric data by photographing the hand 74 with the device 14.

It should be appreciated that because the hand image 76 aligns approximately with the outline image 48 during capture, hand biometric data captured during authentication is typically captured at a different, but similar, orientation as the hand biometric data captured during enrollment in the BAC system 12. Moreover, it should be understood that the size of the hand biometric data image captured during authentication may typically be different than the size of the hand biometric data image captured during enrollment. In the exemplary embodiment, the size of the hand biometric data image captured during authentication is different than the size of the outline image 48. Although the operator photographs the hand 74 with the device 14 in the exemplary embodiment, it should be understood that in other embodiments the security application may cause the device 14 to automatically photograph the hand 74. In such other embodiments, a photograph may be automatically taken when the hand image 76 is within an established tolerance of the outline image 48.

Figure 12:
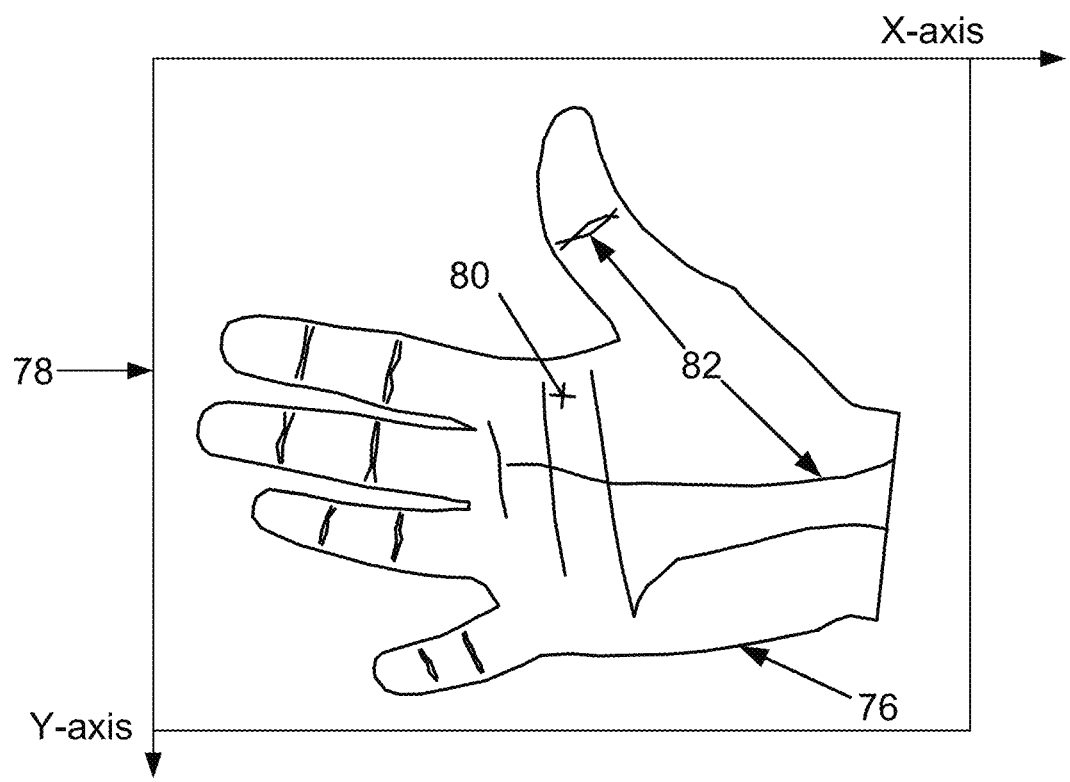
FIG. 12 is a plan view of an exemplary authentication hand image captured by the device.

FIG. 12 is a plan view of an exemplary authentication hand image 78 captured by the device 14 during authentication.

The authentication hand image 78 includes a center point 80, the hand image 76, and biometric features 82 included in the hand image 76. The biometric features 82 are lines and wrinkles in the exemplary embodiment. However, in other embodiments the biometric features 82 may be any biometric feature including, but not limited to, ridge lines.

Figure 13:
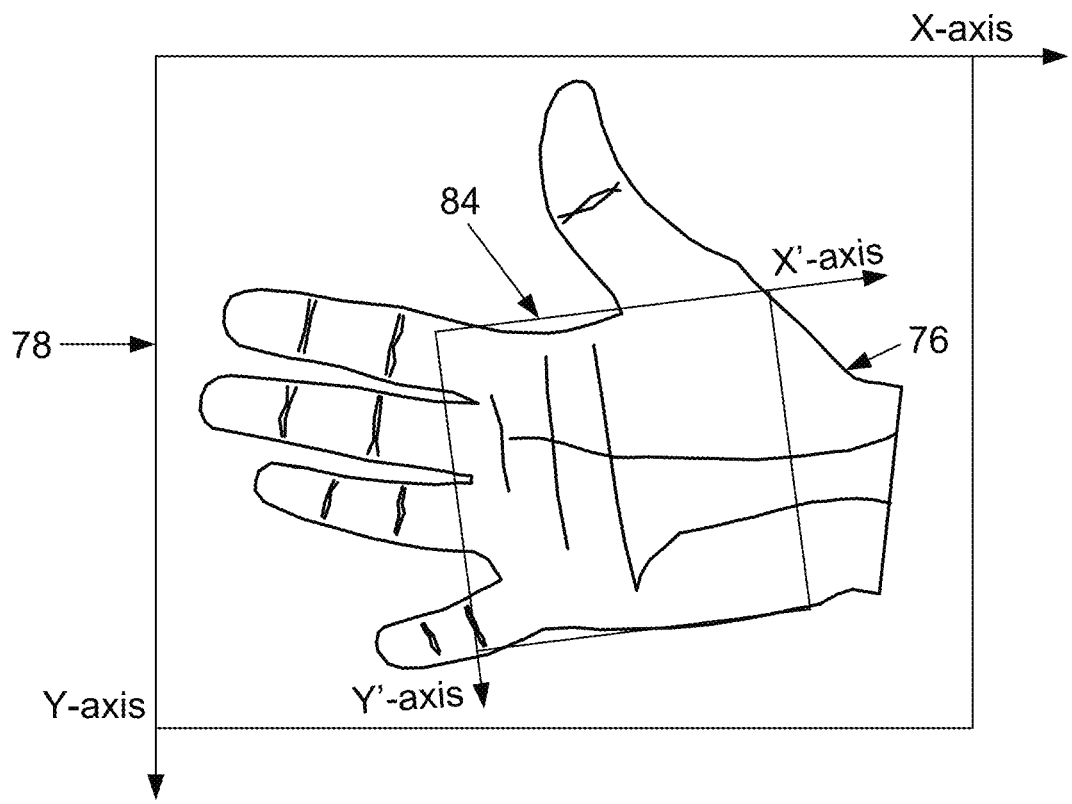
FIG. 13 is a plan view of the exemplary authentication hand image as shown in FIG. 12, further including an authentication region of interest.

FIG. 13 is a plan view of the exemplary authentication hand image 78 as shown in FIG. 12, further including an authentication region of interest 84. The authentication region of interest 84 is determined in a substantially identical way as the enrollment region of interest 30. The authentication region of interest 84 also includes the second Cartesian coordinate system similar to the enrollment region of interest 30. The authentication region of interest 84 defines part of biometric data captured during authentication that is to be used for authentication. Because the authentication region of interest 84 is positioned on the hand image 76 to include mostly the palm portion of the hand image 76, palm biometric data is to be used for authentication in the exemplary embodiment.

In order to facilitate approximately aligning differently oriented and differently sized images of the same biometric modality, during authentication the authentication region of interest 84 is manipulated to be approximately the same as the enrollment region of interest 30. Specifically, the size of the authentication region of interest 84 is increased or decreased by a scale factor such that the size of the authentication region of interest 84 is approximately the same as the size of the enrollment region of interest 30. Furthermore, the authentication region of interest 84 is rotated to have approximately the same orientation as the enrollment region of interest 30. It should be understood that the portion of the hand image 76 within the authentication region of interest 84 is manipulated in concert with the authentication region of interest 84 to have approximately the same size and orientation as the portion of the hand 24 within the enrollment region of interest 30. By thus manipulating the authentication region of interest 84 and the portion of the hand image 76 within the authentication region of interest 84, the portion of the hand image 76 within the authentication region of interest 84 and the portion of the hand 24 within the enrollment region of interest 30 may be approximately aligned with each other such that accurate authentication results may be generated. The authentication region of interest 84 and the enrollment region of interest 30 have the same shape in the exemplary embodiment. After the authentication region of interest 84 is manipulated to have approximately the same size and orientation as the enrollment region of interest 30, a portion of the palm image 76 within the authentication region of interest 84 is converted to a gray scale image.

Although the authentication region of interest 84 is manipulated to have approximately the same size and orientation as the enrollment region of interest 30 in the exemplary embodiment, in other embodiments the enrollment region of interest 30 may be selected to be manipulated in a similar manner to have approximately the same size and orientation as the authentication region of interest 84.

Figure 14:
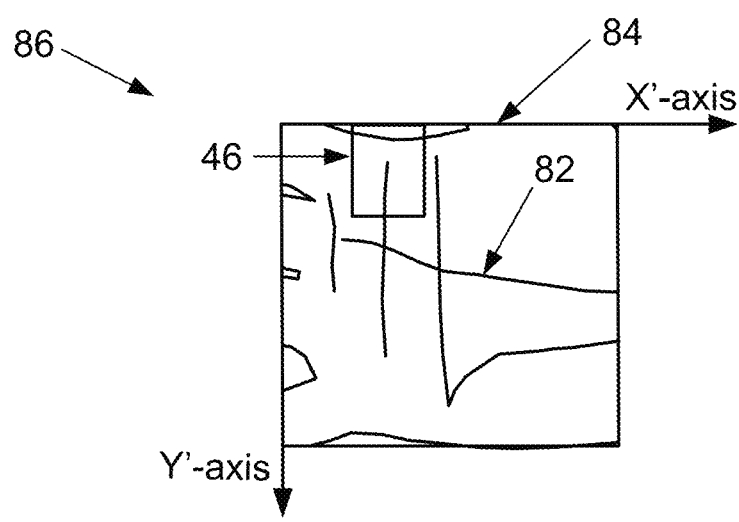
FIG. 14 is a plan view of a gray scale palm image converted from a hand image included in the authentication region of interest.

FIG. 14 is a plan view of a gray scale image 86 converted from the hand image 76 within the authentication region of interest 84. Because the authentication region of interest 84 is positioned on the hand image 76 to include mostly the palm portion of the hand image 76, the gray scale image 86 is also a gray scale image of the palm and is referred to herein as a gray scale palm image 86. The patch area 46 determined during enrollment in the BAC system 12 is used to facilitate determining an optimum area of the gray scale palm image 86 that best correlates to the patch area 46. Specifically, the patch area 46 is incrementally positioned over the entire gray scale palm image 86. In the exemplary embodiment, the patch area 46 is incrementally positioned over the entire gray scale palm image 86 one pixel row or column at a time. At each position, the patch area 46 is compared against the palm biometric data of the gray scale palm image 86 encompassed by the patch area 46 such that a correlation score is determined for each position. An area of the gray scale palm image 86 encompassed by the patch area 46 is referred to herein as a matching area of the gray scale palm image 86. The correlation score indicates the correlation between the patch area 46 and a corresponding matching area of the gray scale palm image 86. Comparing the patch area 46 against the gray scale palm image 86 and generating the correlation scores is referred to herein as applying the patch area 46 against the gray scale palm image 86. It should be understood that the gray scale palm image 86 is rotated through a series of angles and at the same time is scaled through a series of scale factors. For each rotation angle and scale factor combination, the patch area 46 is applied against the gray scale palm image 86.

After calculating the correlation scores for each desired rotation angle and scale factor combination, the best correlation score is determined. Optimum transformation parameters are determined to be the rotation angle and the scale factor that correspond to the best correlation score, as well as the center point coordinates of the matching area that corresponds to the best correlation score. The matching area of the gray scale palm image 86 that corresponds to the patch area 46 at the best correlation score is the optimum area of the gray scale palm image 86. The gray scale palm image 86 is then adjusted by the rotation angle and scale factor corresponding to the best correlation score, and the coordinates of the matching area in the gray scale palm image 86 are calculated using the second Cartesian coordinate system. The rotation angle and the scale factor of the optimum area are also referred to as the optimum rotation angle and the optimum scale factor. The optimum rotation angle, optimum scale factor and the coordinates of the optimum area, together constitute an optimum transformation parameter set.

It should be understood that the authentication region of interest 84 may also be used to generate an authentication mask. Thus, by virtue of knowing the center point coordinates of the patch area 46 in the enrollment region of interest 30, the optimum rotation angle, the optimum scale factor, and the coordinates of the optimum area center point, a transformation necessary for approximately aligning the authentication region of interest 84 with the enrollment region of interest 30 may be calculated. Likewise, the transformation may be calculated for approximately aligning the authentication mask with an enrollment mask generated during enrollment, and for approximately aligning the gray scale palm image 86 with an enrollment gray scale image generated during enrollment. Thus, the transformation is applied against the authentication mask to approximately align the authentication and enrollment masks. The transformation is also applied against the gray scale palm image 86 to approximately align the gray scale palm image 86 with the enrollment gray scale image.

After aligning the authentication and enrollment masks, and aligning the gray scale palm image 86 and the enrollment gray scale image, a biometric template is generated from the aligned gray scale palm image 86. The authentication and enrollment masks are compared to determine a region common to both masks. Biometric template data generated from the aligned gray scale palm image 86 that is also within the common region is used to conduct a biometric authentication matching transaction. The common region may also be referred to as a region of agreement.

In the exemplary embodiment the authentication region of interest 84 is rotated, from its original orientation, through angles ranging from ten degrees clockwise to ten degrees counterclockwise. However, in other embodiments the authentication region of interest 84 may be rotated by angles greater than ten degrees in either the clockwise or counterclockwise directions. Moreover, scale factors are applied to the authentication region of interest 84 that increase and decrease the size of the authentication region of interest 84 by up to twenty percent. However, in other embodiments other scale factors may be applied that increase or decrease the size of the authentication region of interest 84 by greater than twenty percent.

It should be understood that the authentication mask and the gray scale palm image 86 each include the authentication region of interest 84. Thus, all information or data included in the authentication mask and the gray scale palm image 86 is rotated and scaled as described above for the authentication region of interest 84. Computations relating to determination of the optimum area are conducted in the second Cartesian coordinate system.

Figure 15:
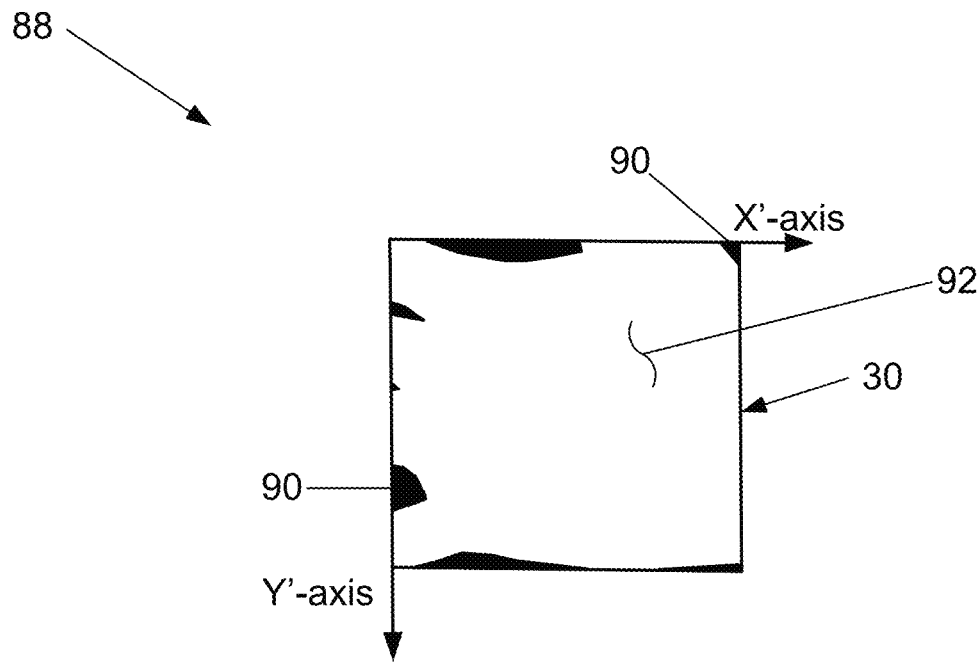
FIG. 15 is a plan view of an enrollment mask generated from the enrollment region of interest during enrollment.

FIG. 15 is a plan view of an enrollment mask 88 generated from the portion of the hand 24 within the enrollment region of interest 30 during enrollment. The enrollment mask 88 includes shaded areas 90 that represent areas not containing valid biometric data within the enrollment region of interest 30. The mask 88 also includes another area 92 that represents areas containing valid biometric data within the enrollment region of interest 30.

Figure 16:
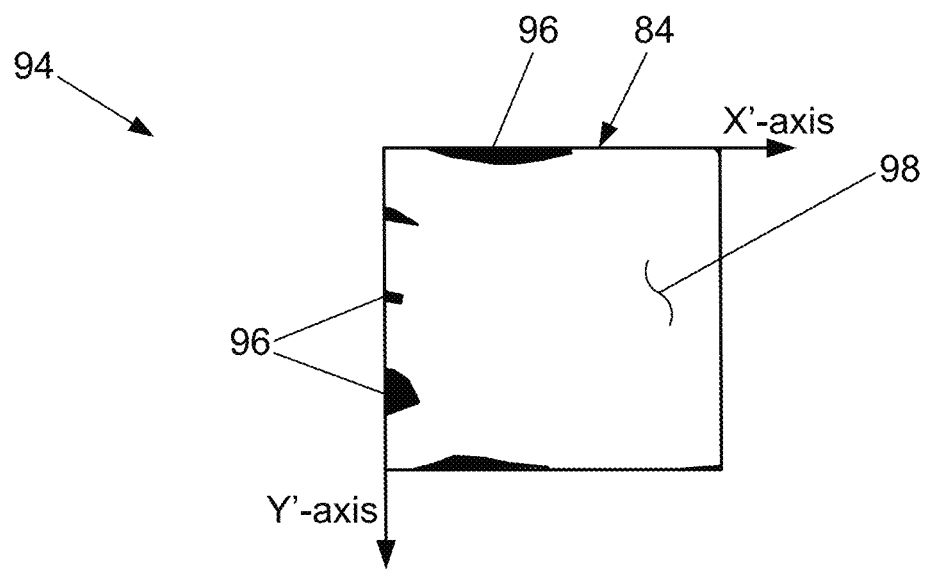
FIG. 16 is a plan view of an authentication mask generated from the authentication region of interest during authentication.

FIG. 16 is a plan view of an authentication mask 94 generated from the portion of the hand image 76 within the authentication region of interest 84 during authentication. The mask 94 includes shaded areas 96 that represent areas not containing valid biometric data within the authentication region of interest 84. The authentication mask 94 also includes another area 98 that represents areas containing valid biometric data within the authentication region of interest 84. During authentication, the enrollment mask 88 and the authentication mask 94 are compared to define a region common to both masks 88, 94. Biometric data within the common region is used for matching during authentication.

Figure 17:
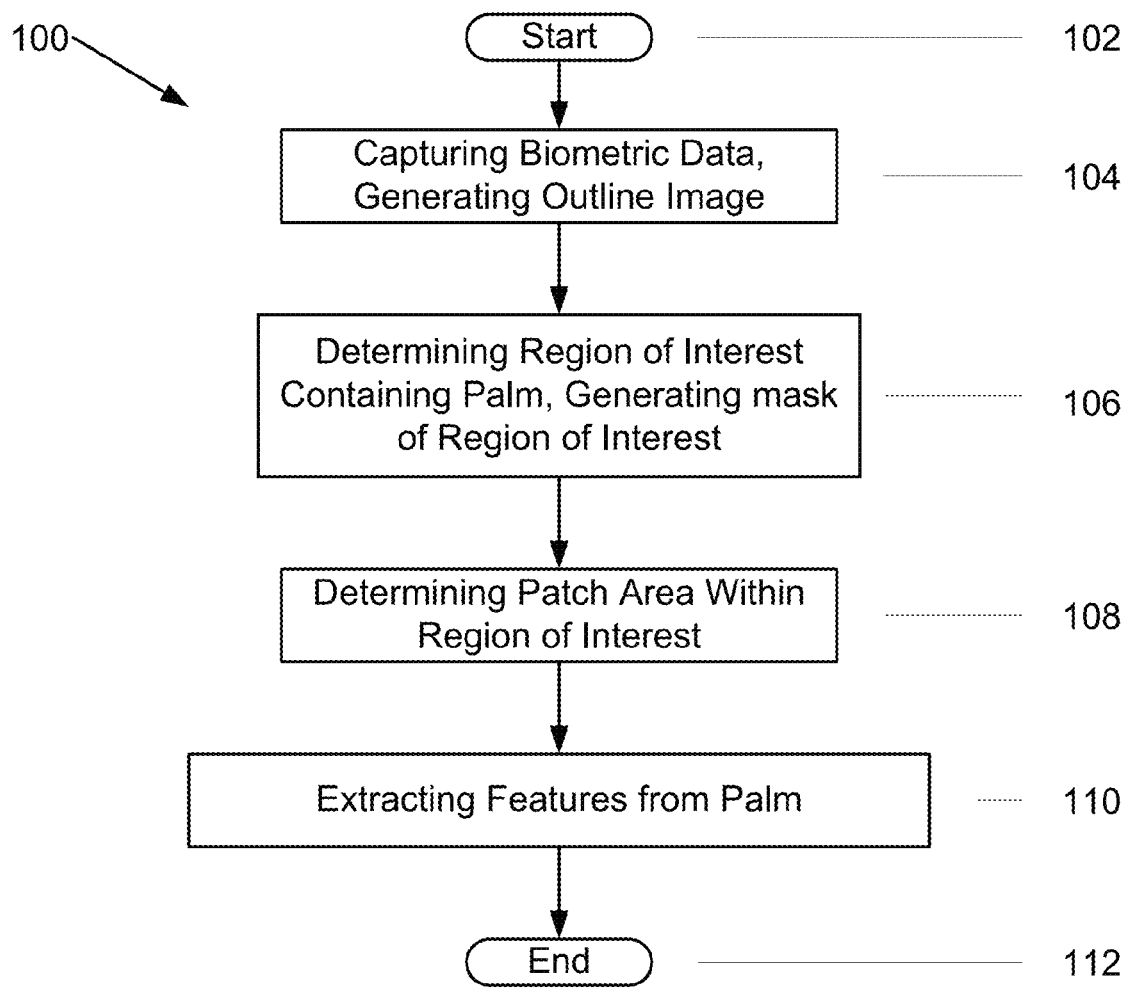
FIG. 17 is a flowchart illustrating an exemplary process for enrolling individuals in a biometric authentication computer (BAC) system.

FIG. 17 is a flowchart 100 illustrating an exemplary process for enrolling individuals in the BAC system 12. The enrolling process starts 102 by activating a security application stored in the device 14. The security application causes the device 14 to display a message prompting the operator to capture desired biometric data. The desired biometric data is the palm side of the right hand. Next, processing continues by capturing biometric data 102, in accordance with the message, from an enrollee with the device 14. Specifically, in the exemplary embodiment the biometric data is captured by photographing the enrollee's hand with the device 14. In the exemplary embodiment a single photograph is taken during enrollment. The device 14 continues processing by transmitting the captured biometric data to the BAC system 12.

Next, the BAC system 12 continues processing by generating 104 the outline image 48, determining 106 the enrollment region of interest 30, and generating 106 the enrollment mask 88. The outline image 48, enrollment region of interest 30, and enrollment mask 88 are stored in the enrollment data record of the enrollee in the BAC system 12.

Processing continues by determining 108 the patch area 46 within the enrollment region of interest 30, processing the patch area 46 into a patch area biometric template, and storing the patch area biometric template in the enrollment data record of the enrollee. After determining 108 the patch area 46, processing continues by extracting biometric features 110 from the captured biometric data included in the enrollment region of interest 30, and processing the extracted biometric features into an enrollment biometric template. Because the enrollment region of interest 30 includes mostly the palm of the hand, the extracted biometric features are palm biometric features. Thus, the enrollment biometric template includes palm biometric data. The enrollment biometric template is stored in the enrollment data record of the enrollee. After extracting the biometric features 110, a message is communicated to, and displayed on, the device 14 notifying the user that enrollment is complete. Next, enrollment processing ends 112.

Although a single photograph is taken during enrollment in the exemplary embodiment, it should be appreciated that in other embodiments a plurality of photographs may be taken that facilitates authentication as described herein. In such other embodiments each photograph is processed as described herein and is stored as an enrollment biometric template in a respective enrollment data record in the BAC system 12. The enrollment regions of interest 30 of each enrollment photograph may be oriented to align with each other. Consequently, after aligning the respective enrollment regions of interest 30, enrollment biometric templates generated for each respective photograph may also be oriented to align with each other. Next, the enrollment biometric templates are stored in the BAC system 12. Moreover, in such other embodiments the outline image 48 is generated from a single one of the photographs. An outline image is not generated for each photograph. Furthermore, although the outline image 48, enrollment region of interest 30, enrollment mask 88, and enrollment biometric template are stored in a respective enrollment data record for each individual enrolled in the BAC system 12 in the exemplary embodiment, in other embodiments additional data may be stored in the enrollment data records of each respective individual enrollee. Such additional data includes, but is not limited to, biometric templates of known imposters, and one or more lists of match scores obtained from matching transactions of known genuine or known imposter candidates. It should be understood that when such additional data is common to multiple individuals, such as biometric templates of known imposters, such additional common data may be referenced from within the enrollment data record of an individual rather than storing the same imposter data within each different enrollment data record.

Imposter biometric templates are generated through the same process used to generate enrollment biometric templates in the exemplary embodiment. The photographs used to generate the imposter biometric templates are referred to herein as imposter photographs. Thus, the enrollment regions of interest 30 of each imposter photograph are also oriented with each other. Moreover, the enrollment regions of interest 30 of each imposter photograph are also aligned with aligned enrollment regions of interest 30 of the enrollment photographs. Thus, the enrollment regions of interest 30 of all enrollment photographs and of all imposter photographs associated with an individual to be authenticated, align with each other. Consequently, imposter biometric templates generated from the imposter photographs also align with each other and with the enrollment biometric templates. In such other embodiments, when the imposter templates and the enrollment biometric templates are aligned with each other to have the same orientation, only a single authentication biometric template is required to be generated during authentication that may be compared against all of the imposter and enrollment biometric templates associated with an individual. However, in yet other embodiments, the enrollment biometric templates and imposter biometric templates may not be oriented to align with each other.

FIG. 18 is a diagram 114 illustrating an exemplary genuine matching score distribution 116 and an exemplary imposter matching score distribution 118. More specifically, the genuine matching score distribution 116 includes a plurality of genuine matching scores 120 and the imposter matching score distribution 118 includes a plurality of imposter matching scores 122. The plurality of genuine matching scores 120 includes at least a maximum genuine matching score 124 and the plurality of imposter matching scores 122 includes at least a minimum imposter matching score 126. The genuine matching score distribution 116 and the imposter score distribution 118 are separated by a distance D calculated as the difference between the minimum imposter matching score 126 and the maximum genuine matching score 124. It should be appreciated that when the minimum imposter matching score 126 is greater than the maximum genuine matching score 124, the minimum imposter matching score 126 may be considered to constitute a threshold score for use during matching transactions. Because the threshold score is determined using biometric data captured from the individual, the threshold score may be referred to as a user specific threshold score. The genuine matching scores 120 and the imposter matching scores 122 as described herein are distance scores.

It should be understood that the genuine matching score distribution 116 and the imposter matching score distribution 118 are separated by a positive distance D, such that the positions of the distributions 116 and 118 correspond to an equal error rate of zero. Consequently, because the minimum imposter matching score 126 is greater than the maximum genuine matching score 124, any matching score value that is greater than the maximum genuine matching score 124 and less than the minimum imposter matching score 126 may be used as the user specific threshold score during authentication.

In the exemplary embodiment a maximum number of five enrollment biometric templates may be stored in the enrollment data record of each respective individual. However, in other embodiments any number of different enrollment biometric templates may be stored in each enrollment data record. When the maximum number of enrollment biometric templates is stored in an enrollment data record, and a new authentication biometric template is requested to be stored in the enrollment data record, the new authentication biometric template is compared against the five enrollment biometric templates to determine if the new authentication biometric template represents better biometric template data than any one of the five enrollment biometric templates. When the new authentication biometric template represents better biometric template data than one of the biometric templates, the one enrollment biometric template is replaced by the authentication biometric template. In the exemplary embodiment any method of determining better biometric template data may be used that facilitates generating the user specific threshold as described herein. Such methods include, but are not limited to, utilizing a quality algorithm to examine the quality and usefulness of the biometric data in the new authentication biometric template in subsequent matching transactions, and generating a quality score reflecting the determined quality and usefulness.

The information shown in FIG. 19 is the same information shown in FIG. 18, as described in more detail below. As such, information illustrated in FIG. 19 that is identical to information illustrated in FIG. 18, is identified using the same reference numerals used in FIG. 18.

FIG. 19 is a diagram 128 illustrating the genuine matching score distribution 116 and the imposter matching score distribution 118, similar to the diagram 114 of FIG. 18. However, the genuine matching score distribution 116 and the imposter matching score distribution 118 share matching scores in an overlapping score distribution region 130. Specifically, at least one genuine matching score 120 falls within the range of the imposter matching score distribution 118, and at least one imposter matching score 122 falls within the range of the genuine matching score distribution 116. The overlapping region 130 is the region of the genuine matching score distribution 116 that falls between the minimum imposter matching score 126 and the maximum genuine matching score 124. Another portion of the genuine matching score distribution 116 that does not overlap with the imposter matching score distribution 118 constitutes a non-overlapping score distribution region 132. Matching scores 120 that fall within the range of the genuine matching score distribution 116 only are considered to fall within the range of the non-overlapping score distribution region 132. Matching scores 120 that fall within the range of the genuine matching score distribution 116 as well as the imposter matching score distribution 118 are considered to fall within the range of the overlapping score distribution region 130. It should be understood that the genuine matching score distribution 116 and the imposter matching score distribution 118 may be used to calculate false match rate and false non-match rate values. These false match rate and false non-match rate values may be plotted to define a false match rate curve and a false non-match rate curve on the same diagram. It should be understood that the false match rate and false non-match rate curves may together define an overlapping error rate region that corresponds to the overlapping score distribution 130. False match rate and false non-match rate values within the range of the overlapping error rate region may be deemed acceptable or unacceptable when compared against a predetermined acceptable error rate.

The information shown in FIG. 20 is the same information shown in FIG. 19, as described in more detail below. As such, information illustrated in FIG. 20 that is identical to information illustrated in FIG. 19, is identified using the same reference numerals used in FIG. 19.

FIG. 20 is a diagram 134 illustrating the genuine matching score distribution 116 and the imposter matching score distribution 118, similar to the diagram of FIG. 19. However, the genuine matching score distribution 116 and the imposter matching score distribution 118 are positioned such that the overlapping score distribution region 130 is wider. As a result, it may be more difficult to identify a threshold score value in the overlapping error rate region that ensures false match rate and false non-match rate values in the overlapping error rate region are less than a predetermined acceptable error rate.

Figure 21:
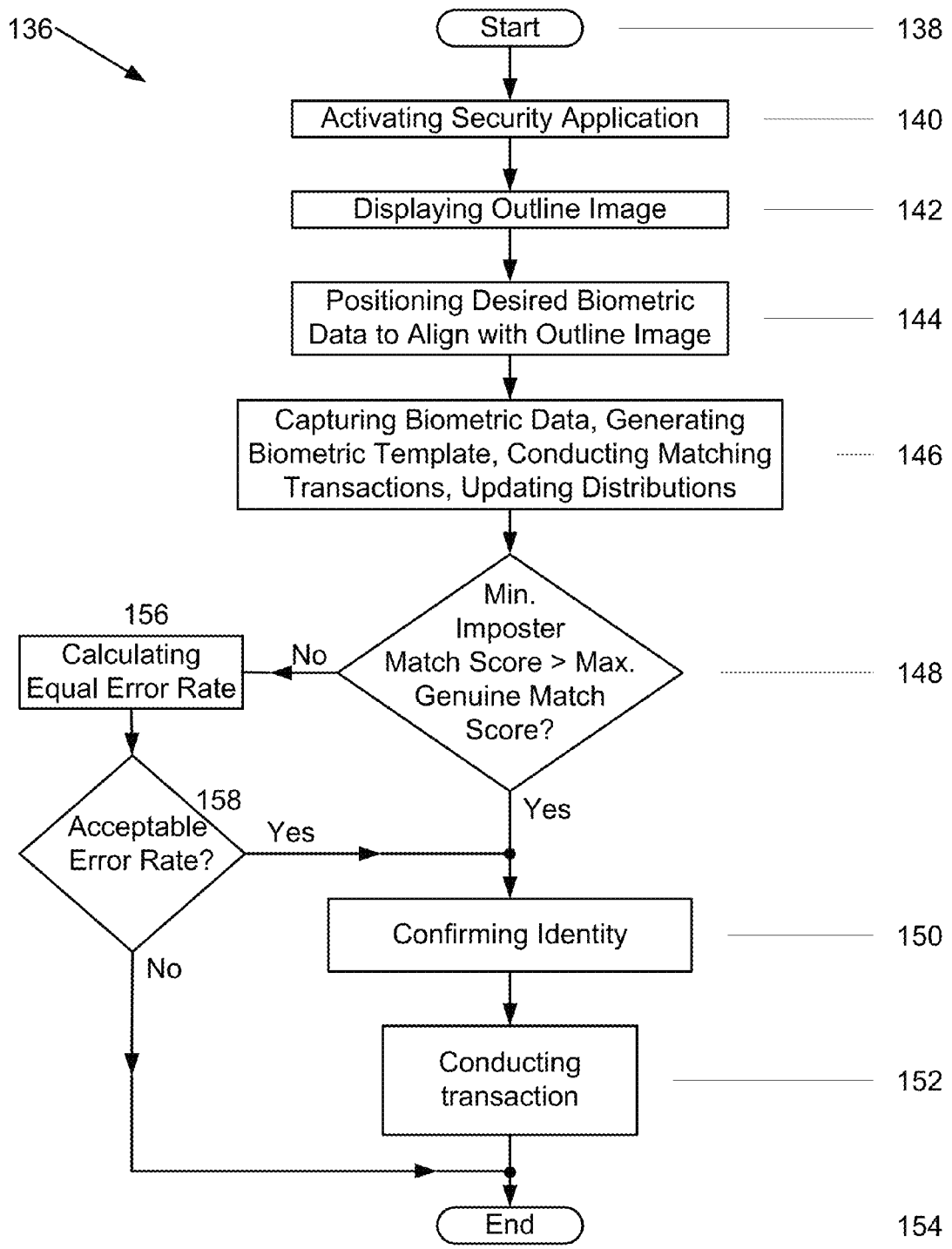
FIG. 21 is a flowchart illustrating an exemplary authentication process.

FIG. 21 is a flowchart 136 illustrating an exemplary authentication process used by the AC system 10 for authenticating the identity of an individual. For AC system 10, the process starts 138 by activating the security application 140 in the device 14 which initiates the authentication process, when the individual desires to be authenticated. It should be appreciated that the individual may desire to be authenticated in many different circumstances including, but not limited to, when conducting any kind of transaction and when requested by security personnel to prove a claim of identity. After initiating the authentication process, the device 14 continues processing by requesting the outline image 48 from the BAC system 12 which transmits the requested outline image 48 to the device 14 for use during authentication.

Next, processing continues by displaying a message on the display screen 20 prompting the operator of the device 14 to capture desired biometric data, and displaying 142 the outline image 48 on the display screen 20 in a stationary position. It should be understood that the biometric modality data captured during authentication should be the same as that captured during enrollment. Thus, biometric data corresponding to the palm side of a right hand is captured during authentication. Accordingly, the outline image 48 corresponds to the palm side of the right hand.

Processing continues by positioning the desired biometric data 144 of the individual proximate to, and with respect to, the device 14 such that the desired biometric data appears as a desired biometric image in an initial position on the display screen 20. The operator continues processing by monitoring the desired biometric image shown on the display screen 20 with respect to the outline image 48 shown on the display screen 20, and positioning the device 14 and the desired biometric data with respect to each other, to better align the outline and desired biometric images, when the initial position of the desired biometric image shown on the display screen 20 does not approximately align with the outline image 48 shown on the display screen 20. The device 14 and the desired biometric data are positioned with respect to each other until the desired biometric image shown on the display screen 20 approximately aligns with the outline image 144 shown on the display screen 20. After positioning the device 14 and the desired biometric data 144 such that the desired biometric image shown on the display screen 20 approximately aligns with the outline image 48 shown on the display screen 20, processing continues by capturing the desired biometric data 146. Specifically, the operator continues processing by photographing the desired biometric data with the device 14. Thus, the desired biometric data is captured while positioned freely in space with respect to the device 14. The device 14 continues processing by communicating the captured biometric data to the BAC system 12. In the exemplary embodiment a single photograph is taken during authentication. However, in other embodiments any number of photographs may be taken.

It should be understood that desired biometric data may be captured during enrollment with the device 14 by approximately aligning a desired biometric data image with the outline image 48 on the display screen 20 as described herein for authentication, if an outline image 48 has been generated and stored in the BAC system 12 prior to enrollment.

Next, processing continues by generating an authentication biometric template 146 from the captured biometric data. Specifically, processing continues by determining the authentication region of interest 84 including the palm from the captured biometric data, and generating the gray scale palm image 86 and the authentication mask 96 for the captured biometric data. Processing continues by determining the optimum area within the authentication region of interest 84, and adjusting the scale and angle of the authentication region of interest 84 such that the adjusted authentication region of interest 84 approximately aligns with the enrollment region of interest 30. The authentication and enrollment masks, and the gray scale palm image 86 and enrollment gray scale image are similarly approximately aligned with each other. Next, processing continues by extracting biometric feature data from the aligned gray scale palm image 86 and generating an authentication biometric template 146 from the extracted biometric feature data. The aligned authentication and enrollment masks are compared to determine the region of agreement. Biometric feature data included in the authentication biometric template that is within the region of agreement is used for conducting biometric verification matching transactions.

Next, processing continues by conducting a plurality of 1:1 verification matching transactions 146 between the authentication biometric template and each of the enrollment biometric templates and known imposter biometric templates associated with the individual in the BAC system 12. Matching transactions conducted between the authentication biometric template and an enrollment biometric template each generate a new genuine matching score 120. Matching transactions conducted between the authentication biometric template and an imposter biometric template each generate a new imposter matching score 122. The new genuine matching scores 120 and the new imposter matching scores 122 are distance scores. After generating at least one new genuine matching score 120 and at least one new imposter matching score 122, processing continues by updating 146 the genuine matching score distribution 116 and the imposter matching score distribution 118 by adding the new genuine matching scores 120 to the genuine matching score distribution 116 and adding the new imposter matching scores 120 to the genuine matching score distribution 116. Next, processing continues by calculating the maximum genuine matching score 124 and the minimum imposter matching score 126.

Processing continues by determining 148 whether the minimum imposter matching score 126 is greater than the maximum genuine matching score 124. When the minimum imposter matching score 126 is greater than the maximum genuine matching score 124, processing continues by confirming the identity of the individual 150. Upon confirming the identity of the individual 150, a message is communicated to, and displayed on, the device 14 notifying the operator of the confirmation, and processing continues by conducting the transaction 152. Next, processing ends 154.

Otherwise, when the minimum imposter matching score 126 is not greater than the maximum genuine matching score 124, processing continues by calculating an equal error rate 156 using the genuine 116 and imposter 118 matching score distributions. The equal error rate is the value at which the false match rate and the false non-match rate, computed using the genuine 116 and imposter 118 matching score distributions, are equal. After calculating the equal error rate 156, processing continues by determining whether the calculated equal error rate is acceptable 158. Specifically, processing continues by comparing the calculated equal error rate against an acceptable error rate. When the calculated error rate is less than or equal to the acceptable error rate, processing continues by confirming the identity of the individual 150. Upon confirming the identity of the individual 150, a message is communicated to, and displayed on, the device 14 notifying the operator of the confirmation, and processing continues by conducting the transaction 152. Next, processing ends 154.

However, when the calculated equal error rate is greater than the acceptable error rate 158, the identity of the individual is not confirmed. A message is communicated to, and displayed on, the device 14 notifying the operator that the individual was not confirmed, and thus cannot conduct the transaction. Next, processing ends 154. It should be appreciated that the power of using candidate lists and score ranks characteristic of 1:N identification is facilitated to be harnessed in a 1:1 verification scheme by virtue of confirming the identity of an individual as described in operations 148, 150, 156, and 158.

In alternative embodiments, rather than using the calculated equal error rate as part of an authentication decision as in the exemplary embodiment, the false match rate (FMR), the false non-match rate (FNMR), or combination of these may be calculated and utilized as part of the authentication decision. For example, after calculating the FMR, processing may continue by determining whether the calculated FMR is acceptable. Specifically, processing may continue by comparing the calculated FMR against an acceptable FMR. When the calculated error rate is less than or equal to the acceptable error rate, processing may continue by confirming the identity of the individual.

Although a single outline image 48 is generated by and stored in the BAC system 12 in the exemplary embodiment, in other embodiments a plurality of outline images of different biometric modalities, for each individual, may be stored in the BAC system 12. In such other embodiments an outline image of the right hand and an outline image of the left hand may both be stored in the BAC system 12. Thus, prior to requesting the outline image 48 during authentication, the operator may select one of the outline images to be used for authentication. Moreover, when the desired biometric data to be captured includes biometric data of different modalities, outline images corresponding to each different modality may be selected and presented in succession on the display screen 20. For example, the left hand image outline may be displayed first and the right hand image outline may be shown on the display screen 20 second.

Although the genuine matching score distribution 116 and the imposter matching score distribution 118 are updated each time an individual's identity is confirmed during authentication in the exemplary embodiment, it should be appreciated that in other embodiments the genuine 116 and imposter 118 matching score distributions may be generated from only the new genuine matching scores 120 and the new imposter matching scores 122.

Although the identity of an individual is confirmed by evaluating the maximum genuine matching score 124 and the minimum imposter matching score 126, or by determining whether an equal error rate satisfies an acceptable error rate in the exemplary embodiment, in other embodiments the identity of an individual may be confirmed using any other method that facilitates confirming the identity of individuals. Such other methods include, but are not limited to, comparing the at least one new genuine matching score 120 and the at least one new imposter matching score 122 against a threshold score that satisfies a predetermined error rate based on the existing matching scores in the genuine matching score distribution 116 and the imposter matching score distribution 118. In such an embodiment, the genuine matching score distribution 116 and the imposter matching score distribution 118 are not updated and the threshold score is calculated from the existing genuine matching scores 120 and the existing imposter matching scores 122. Moreover, when a predetermined percentage of the new genuine matching scores 120 satisfy the threshold score the identity of the individual may be confirmed. Furthermore, the identity of an individual may be confirmed when the required percentage of new genuine matching scores 120 satisfies the threshold score, and a predetermined percentage of the new imposter matching scores 122 satisfies the threshold score. Alternatively, the identity of the individual may be confirmed when only the predetermined percentage of new imposter scores 122 satisfies the threshold score.

Although the genuine matching scores 120 and the imposter matching scores 122 are described as distance scores in the exemplary embodiment, it should be appreciated that in other embodiments the genuine matching scores 120 and imposter matching scores 122 may be computed as similarity scores without loss of generality. Thus, all computations described herein using distance scores also have counterpart computations based on such similarity scores.

In each embodiment, the above-described processes for capturing palm biometric data and applying a transform to the captured palm biometric data, facilitate reducing the time and costs of accurately authenticating the identity of an individual based on palm biometric data captured while positioned freely in space. More specifically, an outline image is generated from hand biometric data captured with a device during enrollment in an authentication system. During authentication, the outline image appears on the device display. While aiming the device at a hand, an image of the hand also appears on the device display. The image of the hand may be positioned within the display to be approximately aligned with the outline image. When the image of the hand approximately aligns with the outline image in the device display, the hand is captured as biometric data by the device. A region of interest defines that palm biometric data included in the captured hand biometric data is to be used during authentication. A transform is calculated and is applied to the captured palm biometric data within the region of interest. The transform causes the captured palm biometric data to have approximately the same size and orientation as the palm biometric data captured during enrollment. As a result, biometric authentication of identities facilitates reducing the time and costs associated with authentication based on palm biometric data captured while positioned freely in space with a device readily available to the members of the general public. Accordingly, biometric authentication of identities is facilitated to be enhanced in a cost effective and reliable manner.

Exemplary embodiments of processes and systems that facilitate convenient, flexible and inexpensive biometric authentication based on palm biometric data are described herein. The processes are not limited to use with the specific computer system embodiments described herein, but rather, the processes can be utilized independently and separately from other processes described herein. Moreover, the invention is not limited to the embodiments of the processes and systems described above in detail. Rather, other variations of the processes may be utilized within the spirit and scope of the claims.

While the invention has been described in terms of various specific embodiments, those skilled in the art will recognize that the invention can be practiced with modification within the spirit and scope of the claims.

What is claimed is:

1. A method of authentication comprising:
   conducting verification matching transactions between an authentication biometric template and enrollment biometric templates, and between the authentication biometric template and imposter biometric templates with a biometric authentication system, the imposter biometric templates being associated with known imposters;
   updating a genuine matching score distribution with at least one genuine matching score generated during said conducting step;
   updating an imposter matching score distribution with at least one imposter matching score generated during said conducting step;
   calculating a minimum genuine matching score and a maximum imposter matching score;
   determining whether the maximum imposter matching score is less than the minimum genuine matching score; and
   confirming an identity of an individual when the maximum imposter matching score is less than the minimum genuine matching score.

2. A method in accordance with claim 1, further comprising conducting a transaction after said confirming step.

3. A method in accordance with claim 1, further comprising calculating an equal error rate when the minimum genuine matching score is equal to or less than the maximum imposter matching score.

4. A method in accordance with claim 3, further comprising:
    comparing the equal error rate against an acceptable error rate; and
    confirming the identity of the individual when the equal error rate is less than or equal to the acceptable error rate.

5. A method in accordance with claim 1, further comprising communicating a message from the biometric authentication system to a portable device notifying a device operator that the identity of the individual was not confirmed.

6. A method in accordance with claim 1, further comprising:
    photographing the palm of a hand with a device, the hand being positioned freely in space with respect to the device; and
    generating the authentication biometric template from the photograph.

7. A method in accordance with claim 1, further comprising displaying an outline image on a portable device and an image of desired biometric data on the portable device such that the outline image and biometric data image approximately align.

8. A system for conducting authentication matching transactions comprising:
    an authentication system including an authentication database, said authentication system being configured to store within said database authentication data for individuals, matching scores, and matching score distributions; and
    a device configured to capture biometric data positioned freely with respect to said device, said device and said authentication system being configured to communicate over a network, said authentication system being further configured to
        generate an authentication biometric template from captured biometric data,
        conduct matching transactions between the authentication biometric template and enrollment biometric templates stored therein, and between the authentication biometric template and imposter biometric templates stored therein,
        generate a genuine matching score distribution and an imposter matching score distribution, and calculate a minimum genuine matching score and a maximum imposter matching score, and
        confirm an identity of an individual associated with the captured biometric data when the maximum imposter matching score is less than the minimum genuine matching score.

9. A system in accordance with claim 8, said authentication system being further configured to:
    update the genuine matching score distribution with at least one genuine matching score generated during a matching transaction; and
    update the imposter matching score distribution with at least one imposter matching score generated during the matching transaction.

10. A system in accordance with claim 9, said authentication system being further configured to calculate an equal error rate when the minimum genuine matching score is equal to or less than the maximum imposter matching score.

11. A system in accordance with claim 10, said authentication system being further configured to:
    compare the equal error rate against an acceptable error rate; and
    confirm the identity of the individual when the equal error rate is less than or equal to the acceptable error rate.

12. A system in accordance with claim 8, said device being one of the following:
    a smart phone;
    a tablet computer;
    a television;
    a personal computer;
    a personal digital assistant;
    a camera; and
    a laptop computer.

13. A system in accordance with claim 8, said authentication system being further configured to communicate a message to said device notifying a device operator that the identity of the individual has been confirmed.

14. A system in accordance with claim 8, said device being further configured to:
    display an outline image and a desired biometric data image; and
    capture the desired biometric data when the outline image and the desired biometric data image align.

15. A method of authentication comprising:
    conducting matching transactions between an authentication biometric template and enrollment biometric templates and between the authentication biometric template and imposter biometric templates with a biometric authentication system;
    updating a matching score distribution and an imposter score distribution with results generated during said conducting step;
    determining whether a maximum imposter matching score is less than a minimum genuine matching score; and
    confirming an identity of an individual when the maximum imposter score is less than the minimum genuine matching score.

16. A method in accordance with claim 15, further comprising calculating an equal error rate when the minimum genuine matching score is equal to or less than the maximum imposter matching score.

17. A method in accordance with claim 16, further comprising:
    comparing the equal error rate against an acceptable error rate; and
    confirming the identity of the individual when the equal error rate is less than or equal to the acceptable error rate.

* * * * *